(12) United States Patent
Satoh

(10) Patent No.: US 11,378,871 B2
(45) Date of Patent: Jul. 5, 2022

(54) OPTICAL SYSTEM, AND IMAGING APPARATUS

(71) Applicant: Ricoh Company, Ltd., Tokyo (JP)

(72) Inventor: Hiroyuki Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/966,615

(22) PCT Filed: Feb. 26, 2019

(86) PCT No.: PCT/JP2019/007231
§ 371 (c)(1),
(2) Date: Jul. 31, 2020

(87) PCT Pub. No.: WO2019/167925
PCT Pub. Date: Sep. 6, 2019

(65) Prior Publication Data
US 2021/0026227 A1    Jan. 28, 2021

(30) Foreign Application Priority Data

Mar. 2, 2018 (JP) .............................. JP2018-037303
Dec. 19, 2018 (JP) .............................. JP2018-237191

(51) Int. Cl.
*H04N 5/247* (2006.01)
*G03B 17/17* (2021.01)
(Continued)

(52) U.S. Cl.
CPC .............. *G03B 17/17* (2013.01); *G02B 13/06* (2013.01); *H04N 5/2252* (2013.01); *H04N 5/2254* (2013.01); *H04N 5/2258* (2013.01)

(58) Field of Classification Search
CPC ........ G02B 13/04; G02B 13/06; G02B 13/18; G02B 13/0065; G02B 13/0085; G02B 27/0025; G03B 15/00; G03B 17/17; G03B 19/07; G03B 37/00; G03B 35/08; G03B 30/00; H04N 5/225; H04N 5/232; H04N 5/2252; H04N 5/2254; H04N 5/2258;
(Continued)

(56) References Cited

U.S. PATENT DOCUMENTS 5,640,632 A    6/1997  Koyama et al.
9,678,099 B2   6/2017  Maryfield et al.
(Continued)

FOREIGN PATENT DOCUMENTS

CN    1084287 A     3/1994
CN    101208627 A   6/2008
(Continued)

OTHER PUBLICATIONS

International Search Report and Written Opinion dated Jun. 18, 2019 in PCT/JP2019/007231 filed on Feb. 26, 2019.
(Continued)

*Primary Examiner* — Patrick E Demosky
(74) *Attorney, Agent, or Firm* — Xsensus LLP

(57) ABSTRACT

An optical system including two optical systems, each optical system including at least two reflectors and a stop. Each of the optical systems is configured to focus light. Each of the at least two reflectors is configured to reflect the light.

11 Claims, 22 Drawing Sheets

(51) Int. Cl.
*G02B 13/06* (2006.01)
*H04N 5/225* (2006.01)

(58) Field of Classification Search
CPC .. H04N 13/218; H04N 13/279; H04N 13/271; H04N 5/23238; H04N 7/142; H04N 5/247; H04N 5/23245; H01L 27/14627; H01L 27/1464; H01L 49/00; H01L 27/14632
See application file for complete search history.

(56) References Cited

U.S. PATENT DOCUMENTS

| | | | |
|---|---|---|---|
| 9,782,056 B2 | 10/2017 | McDowall | |
| 2005/0088762 A1* | 4/2005 | Ohashi | G02B 13/22 359/754 |
| 2006/0227415 A1 | 10/2006 | Caldwell et al. | |
| 2007/0126911 A1 | 6/2007 | Nanjo | |
| 2010/0045773 A1 | 2/2010 | Ritchey | |
| 2012/0113209 A1 | 5/2012 | Ritchey et al. | |
| 2013/0050405 A1 | 2/2013 | Masuda et al. | |
| 2013/0050408 A1 | 2/2013 | Masuda et al. | |
| 2013/0057542 A1 | 3/2013 | Takenaka et al. | |
| 2013/0063550 A1 | 3/2013 | Ritchey et al. | |
| 2013/0063754 A1 | 3/2013 | Saisho et al. | |
| 2013/0235149 A1 | 9/2013 | Tanaka et al. | |
| 2013/0242040 A1 | 9/2013 | Masuda et al. | |
| 2013/0278731 A1 | 10/2013 | Inomoto | |
| 2013/0326419 A1 | 12/2013 | Harada et al. | |
| 2014/0036031 A1 | 2/2014 | Tomonori et al. | |
| 2014/0071226 A1 | 3/2014 | Satoh et al. | |
| 2014/0071227 A1 | 3/2014 | Takenaka et al. | |
| 2014/0078247 A1 | 3/2014 | Shohara et al. | |
| 2014/0132709 A1 | 5/2014 | Satoh et al. | |
| 2014/0152852 A1 | 6/2014 | Ito et al. | |
| 2014/0176542 A1 | 6/2014 | Shohara et al. | |
| 2014/0218468 A1* | 8/2014 | Gao | G02B 27/144 348/36 |
| 2015/0015664 A1 | 1/2015 | Masuda et al. | |
| 2015/0015766 A1 | 1/2015 | Satoh et al. | |
| 2015/0042647 A1 | 2/2015 | Shohara et al. | |
| 2015/0062363 A1 | 3/2015 | Takenaka et al. | |
| 2015/0192762 A1 | 7/2015 | Satoh et al. | |
| 2015/0222816 A1 | 8/2015 | Shohara et al. | |
| 2015/0301316 A1* | 10/2015 | Masuda | G02B 17/023 348/36 |
| 2015/0324692 A1 | 11/2015 | Ritchey et al. | |
| 2016/0006907 A1 | 1/2016 | Masuda et al. | |
| 2016/0147045 A1 | 5/2016 | Masuda et al. | |
| 2016/0182825 A1 | 6/2016 | Tanaka et al. | |
| 2016/0255305 A1 | 9/2016 | Ritchey et al. | |
| 2016/0266359 A1 | 9/2016 | Amano et al. | |
| 2016/0313541 A1 | 10/2016 | Satoh et al. | |
| 2016/0337584 A1 | 11/2016 | Masuda et al. | |
| 2016/0353020 A1 | 12/2016 | Satoh | |
| 2017/0061034 A1 | 3/2017 | Ritchey et al. | |
| 2017/0116704 A1 | 4/2017 | Takenaka et al. | |
| 2017/0270381 A1 | 9/2017 | Itoh et al. | |
| 2017/0276954 A1* | 9/2017 | Bajorins | G02B 27/149 |
| 2017/0310895 A1 | 10/2017 | Masuda et al. | |
| 2017/0315336 A1 | 11/2017 | Masuda et al. | |
| 2017/0359568 A1* | 12/2017 | Georgiev | H04N 5/2254 |
| 2018/0024333 A1 | 1/2018 | Satoh et al. | |
| 2018/0213152 A1 | 7/2018 | Masuda et al. | |
| 2019/0230283 A1* | 7/2019 | Ollier | H04N 5/2254 |

FOREIGN PATENT DOCUMENTS

| | | | |
|---|---|---|---|
| CN | 103685886 A | 3/2014 | |
| CN | 106168707 A | 11/2016 | |
| EP | 1 788 419 A1 | 5/2007 | |
| EP | 3 006 984 A1 | 4/2016 | |
| EP | 3 190 780 A1 | 7/2017 | |
| JP | 2007-033819 | 2/2007 | |
| JP | 2013-057993 | 3/2013 | |
| JP | 2013-097280 | 5/2013 | |
| JP | 2013-218160 | 10/2013 | |
| JP | 2014-056048 | 3/2014 | |
| JP | 2015-019344 | 1/2015 | |
| JP | 2015-230444 A | 12/2015 | |
| JP | 2016-009152 | 1/2016 | |
| JP | 2016-027744 | 2/2016 | |
| JP | 2016-170352 | 9/2016 | |
| JP | 2017-525221 | 8/2017 | |
| JP | 2017-223753 | 12/2017 | |
| KR | 10-2006-0091513 A | 8/2006 | |
| WO | WO2015/195629 A1 | 12/2015 | |
| WO | WO2016/103446 A1 | 6/2016 | |
| WO | WO-2016103446 A1 * | 6/2016 | A61B 1/00 |
| WO | WO-2018000651 A * | 1/2018 | G02B 13/06 |

OTHER PUBLICATIONS

CS&E—Upload peer contribution by CNIPA on May 15, 2019 in PCT/JP2019/007231 filed on Feb. 26, 2019.
CS&E—Upload peer contribution by EPO on May 6, 2019 in PCT/JP2019/007231 filed on Feb. 26, 2019.
CS&E—Upload peer contribution by KIPO on May 20, 2019 in PCT/JP2019/007231 filed on Feb. 26, 2019.
CS&E—Upload peer contribution by USPTO on May 8, 2019 in PCT/JP2019/007231 filed on Feb. 26, 2019.
Office Action dated Oct. 11, 2021 in Chinese Patent Application No. 201980015233.X, 7 pages.
Office Action dated May 2, 2022 in European Patent Application No. 19 760 207.1, 6 pages.

* cited by examiner

FIG. 17

```
LENS DATA
f=2.6(mm), fNO=2.15, w=100(°)
```

| SURFACE NUMBER | R | D | Nd | νd |
|---|---|---|---|---|
| 1(NEGATIVE FRONT GROUP) | 30.68 | 1.20 | 1.85 | 23.78 |
| 2(NEGATIVE FRONT GROUP) | 11.83 | 2.65 | | |
| 3*(NEGATIVE FRONT GROUP) | 57.01 | 0.80 | 1.85 | 40.39 |
| 4*(NEGATIVE FRONT GROUP) | 7.23 | 4.52 | | |
| 5*(NEGATIVE FRONT GROUP) | -20.36 | 0.70 | 1.82 | 42.71 |
| 6*(NEGATIVE FRONT GROUP) | 308.51 | 0.20 | | |
| 7(FIRST PRISM) | Infinity | 9.30 | 1.82 | 46.62 |
| 8(FIRST PRISM) | Infinity | 3.90 | | |
| 9(SECOND PRISM) | Infinity | 8.00 | 1.82 | 46.62 |
| 10 (SECOND PRISM) | Infinity | 0.50 | | |
| 11*(POSITIVE REAR GROUP) | 25.81 | 3.21 | 2.00 | 19.32 |
| 12*(POSITIVE REAR GROUP) | -31.14 | 0.17 | | |
| 13*(POSITIVE REAR GROUP) | 66.44 | 3.30 | 1.73 | 54.04 |
| 14*(POSITIVE REAR GROUP) | 90.73 | 0.26 | | |
| 15(POSITIVE REAR GROUP) | 34.26 | 2.87 | 1.73 | 54.68 |
| 16(POSITIVE REAR GROUP) | -10.30 | 0.84 | 1.85 | 23.78 |
| 17(POSITIVE REAR GROUP) | 19.44 | 0.10 | | |
| 18(POSITIVE REAR GROUP) | 8.62 | 5.20 | 1.50 | 81.55 |
| 19(POSITIVE REAR GROUP) | -8.62 | 0.70 | 1.85 | 23.78 |
| 20(POSITIVE REAR GROUP) | 21.73 | 0.10 | | |
| 21(POSITIVE REAR GROUP) | 18.00 | 2.80 | 1.70 | 55.46 |
| 22*(POSITIVE REAR GROUP) | -12.67 | 0.13 | | |
| 23(THIRD PRISM) | Infinity | 10.40 | 1.88 | 40.77 |
| 24(THIRD PRISM) | Infinity | 1.67 | 1.62 | 63.86 |
| 25*(CONVEX SURFACE) | -8.52 | 0.52 | | |
| 26(COVER GLASS) | Infinity | 0.50 | 1.52 | 64.14 |
| 27(COVER GLASS) | Infinity | 1.20 | | |
| 28(IMAGING PLANE) | Infinity | 0.00 | 0.00 | |

FIG. 18

ASPHERICAL SURFACE DATA

| THIRD SURFACE | TWELFTH SURFACE |
|---|---|
| 4th: 1.13E-05 | 4th: 2.05E-04 |
| 6th: 6.96E-06 | 6th: -1.82E-05 |
| 8th: -5.49E-08 | 8th: 4.81E-07 |
| 10th: -1.82E-10 | 10th: 6.15E-08 |
| 12th: -2.57E-13 | 12th: -4.91E-09 |
| 14th: 9.79E-14 | 14th: 9.99E-11 |
| 16th: -5.42E-16 | THIRTEENTH SURFACE |
| FOURTH SURFACE | 4th: 1.18E-04 |
| 4th: -1.07E-03 | 6th: -2.45E-05 |
| 6th: 4.27E-05 | 8th: 1.17E-06 |
| 8th: -7.88E-07 | 10th: 2.06E-08 |
| 10th: -5.07E-09 | 12th: -4.26E-10 |
| 12th: 7.20E-10 | 14th: -6.40E-11 |
| 14th: -1.43E-12 | 16th: 1.01E-12 |
| 16th: -4.65E-13 | FOURTEENTH SURFACE |
| FIFTH SURFACE | 4th: 2.94E-08 |
| 4th: -1.24E-03 | 6th: 7.20E-07 |
| 6th: 2.65E-05 | 8th: -8.02E-08 |
| 8th: -3.95E-06 | 10th: 1.83E-08 |
| 10th: 1.41E-07 | 12th: 2.72E-10 |
| 12th: -1.45E-09 | 14th: -6.13E-12 |
| 14th: 1.89E-10 | 16th: -1.10E-12 |
| 16th: -5.43E-12 | TWENTY-SECOND SURFACE |
| SIXTH SURFACE | 4th: 3.00E-04 |
| 4th: -5.49E-04 | 6th: 1.19E-05 |
| 6th: 1.62E-06 | 8th: -8.80E-07 |
| 8th: -1.89E-06 | 10th: 3.68E-08 |
| 10th: 1.05E-07 | 12th: -9.95E-10 |
| ELEVENTH SURFACE | 14th: 1.19E-11 |
| 4th: 1.02E-04 | TWENTY-FIFTH SURFACE |
| 6th: -1.34E-06 | 4th: 4.82E-03 |
| 8th: 1.08E-07 | 6th: -4.70E-04 |
| 10th: -1.61E-08 | 8th: 3.03E-05 |
| 12th: -2.61E-10 | 10th: -1.13E-06 |
| 14th: 3.19E-11 | 12th: 2.27E-08 |
| | 14th: -1.87E-10 |

OPTICAL SYSTEM, AND IMAGING APPARATUS

TECHNICAL FIELD

Embodiments of the present disclosure relate to an imaging optical system, an imaging system incorporating the imaging optical system, and an imaging apparatus incorporating the imaging system.

BACKGROUND ART

Spherical imaging systems are known that include two imaging systems each having the same configuration using a wide-angle lens with a wide angle of view of 180 degrees or more and an image sensor that captures an image formed by the wide-angle lens (JP2014-056048-A and JP-6019970-B). Such spherical imaging systems are configured to generate an image within a solid angle of $4\pi$ steradian by combining images captured by two image sensors.

CITATION LIST

Patent Literature

[PTL 1] JP-2014-056048-A
[PTL 2] JP-6019970-B

SUMMARY

Technical Problem

There is a need for such spherical imaging systems to reduce the disparity that corresponds to an overlapping area of two images joined together by calibration while making the system more compact (i.e., thinner). In order to meet this need, the spherical imaging systems (JP2014-056048-A and JP-6019970-B) are provided with a prism (reflecting plane) so as to reduce the distance (distance between maximum angle-of-view points) between positions at which light rays forming a maximum angle of view strike the lens closest to the object side in the two imaging optical systems.

Conceivably, a typical spherical imaging system could be provided with larger image sensors to obtain a higher-quality image. This configuration, however, adversely increases the distance between the positions at which light rays forming a maximum angle of view strike the lens closest to the object side in the two imaging optical systems, to obtain a space sufficient for such image sensors to be disposed. As a result, the imaging system upsizes (thickness increases) and the disparity also increases, which leads to a deterioration in image quality. That is, the typical spherical imaging system fails to reduce the distance between the positions at which light rays forming a maximum angle of view strike the lens closest to the object side, i.e., disparity, due to restrictions on the size of the image sensor. Further, with an increase in the size of the image sensor increases, the lens located in front (on the object side) of the image sensor upsizes and the optical path length also increases, resulting in an increase in the size of the entire imaging system.

Accordingly, it is difficult to provide a compact imaging optical system that achieves an increase in the size of an image sensor and a decrease in the sizes (thinning slimming down) of an imaging system and an imaging apparatus while reducing the distance between the positions at which light rays forming a maximum angle of view strike the lens closest to the object (i.e., the disparity) to obtain high-quality images.

Solution to Problem

In view of the above, there is provided an optical system including two optical systems, each optical system including at least two reflectors and a stop. Each of the optical systems is configured to focus light. Each of the at least two reflectors is configured to reflect the light.

Further, there is also provided an imaging apparatus including two optical systems, two image sensors, and a casing housing the two optical systems and the two image sensors. Each optical system includes at least two reflectors and a stop. Each of the optical systems is configured to focus light. Each of the at least two reflectors is configured to reflect the light traveling to a corresponding image sensor of the two image sensors. Each of the optical systems is configured to form an image on the corresponding image sensor.

Advantageous Effects of Invention

With the above configurations, a compact imaging optical system that achieves an increase in the size of an image sensor and a decrease in the sizes (i.e., a slimming down) of an imaging system and an imaging apparatus while reducing the distance between the positions at which light rays forming a maximum angle of view strike the lenses closest to the object, i.e., disparity, to obtain high-quality images can be provided. Further, an imaging system incorporating such an imaging system, and an imaging apparatus incorporating the imaging system can be provided.

BRIEF DESCRIPTION OF DRAWINGS

The aforementioned and other aspects, features, and advantages of the present disclosure will be better understood by reference to the following detailed description when considered in connection with the accompanying drawings. The accompanying drawings are intended to depict embodiments of the present disclosure and should not be interpreted to limit the scope thereof. The accompanying drawings are not to be considered as drawn to scale unless explicitly noted.

FIG. 17 is a table of lens data of the wide-angle lens system according to the embodiments of the present disclosure.

FIG. 18 is a table of aspherical surface data of the wide-angle lens system according to the embodiments of the present disclosure.

DESCRIPTION OF EMBODIMENTS

First Embodiment

Figure 1:
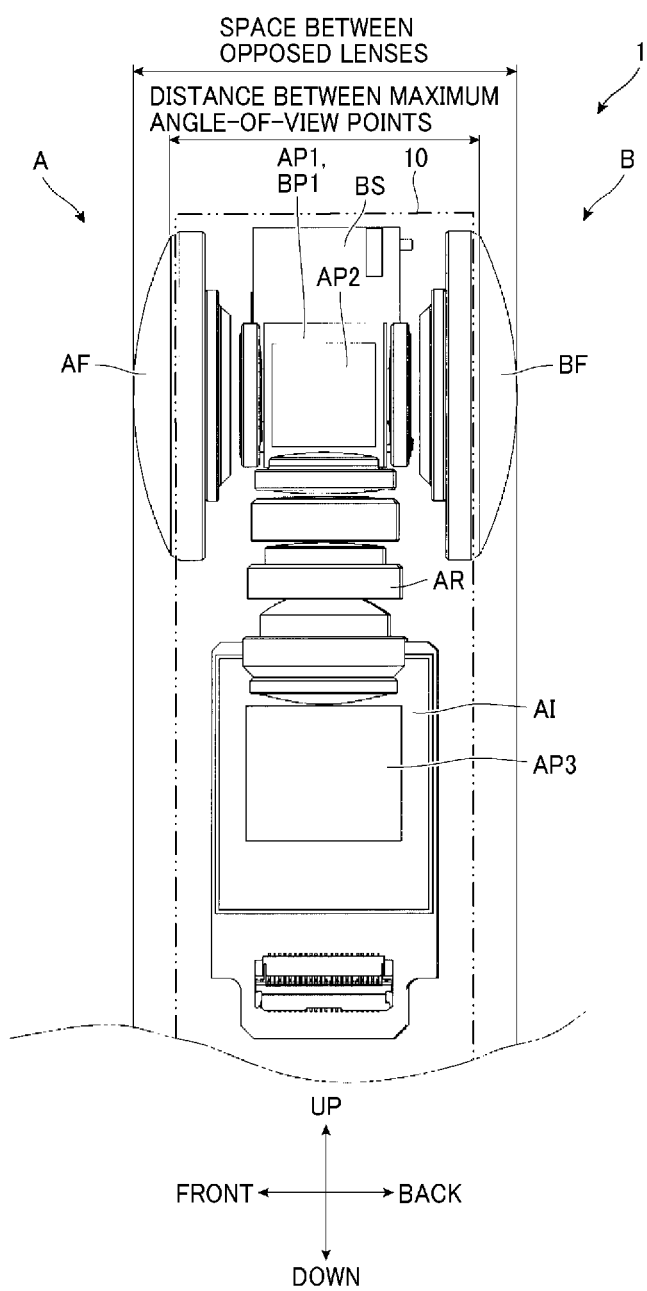
FIG. 1 is an illustration of an imaging system according to a first embodiment of the present disclosure as viewed from the left.
Figure 2:
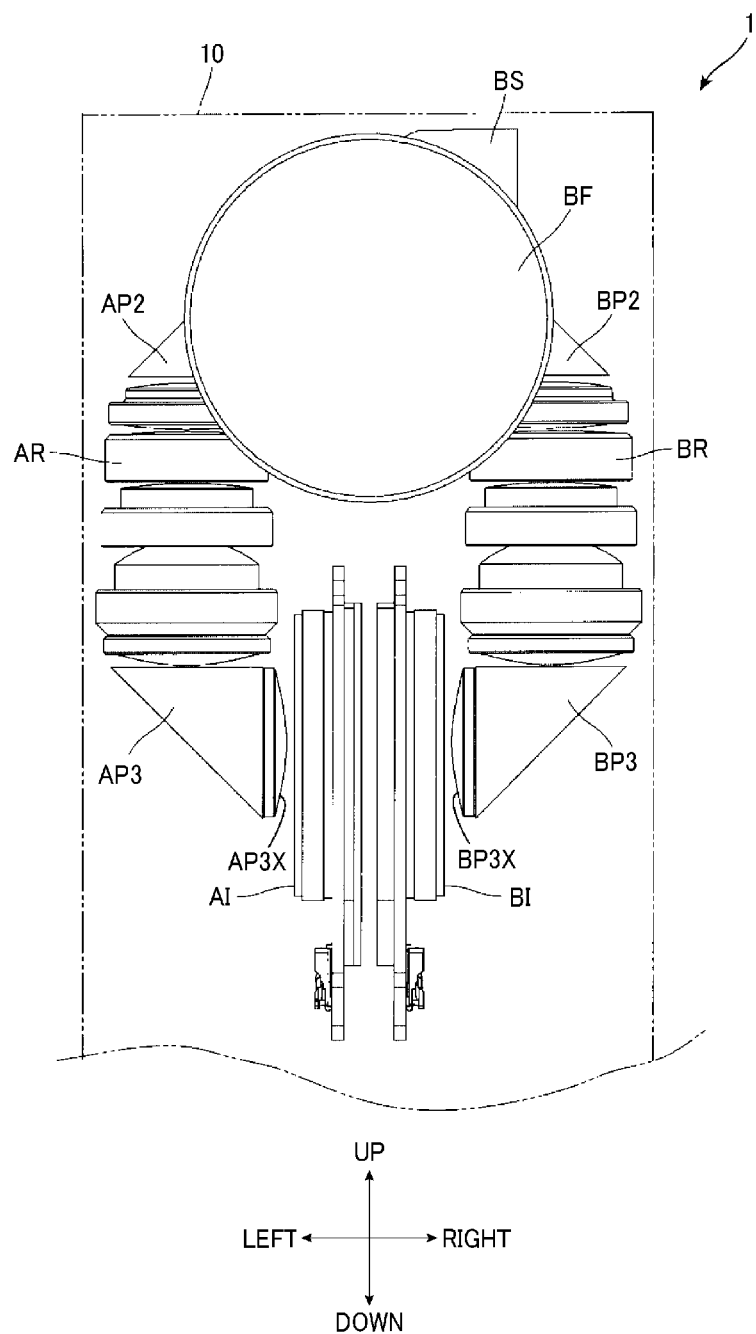
FIG. 2 is a rear view of the imaging system according to the first embodiment in FIG. 1.
Figure 3:
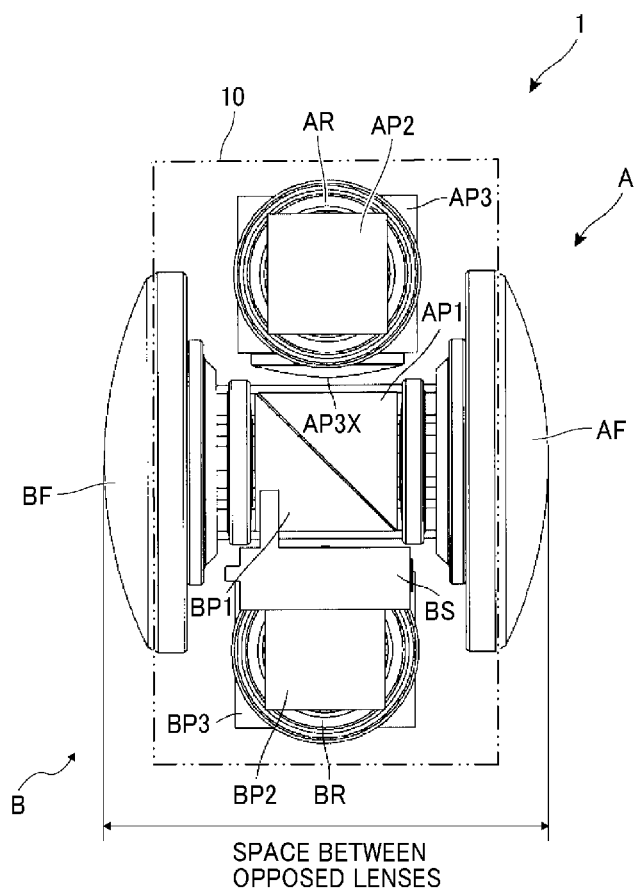
FIG. 3 is a top view of the imaging system in FIG. 1.
Figure 3:
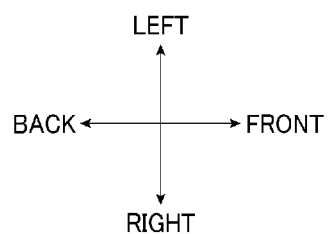

With reference to FIGS. 1 to 4, an imaging system 1 according to a first embodiment is described in detail. As illustrated in FIG. 3, front-to-back direction is parallel to the optical axis of the front lens of the optical axis between the first lens and the third lens of a front group AF or BF. Right-to-left directions is vertical orthogonal to the front-to-back direction. As illustrated in FIG. 2, the up-to-down direction is parallel to a virtual line between the top and the bottom of a casing 10.

The imaging system 1 includes two wide-angle lens systems (fish-eye lens systems, optical systems, an imaging optical system) A and B, two image sensors AI and BI, and a casing 10. Lenses closest to the object side included in the two wide-angle lens systems A and B, respectively face different directions from each other. Each of the image sensors AI and BI forms an image captured by the corresponding wide-angle lens systems A and B. The casing 10 houses the two wide-angle lens systems A and B and the image sensors AI and BI. In FIG. 1 to FIG. 3, the casing 10 is schematically drawn with a virtual line (two-dot chain line). The wide-angle lens systems A and B may have the same specifications, and the image sensors AI and BI may also have the same specifications. Each of the wide-angle lens systems A and B has an angle of view greater than 180 degrees. The imaging system 1 may be configured as a spherical imaging system that combines two images formed by the image sensors AI and BI to obtain an image with a solid angle of $4\pi$ steradian.

The wide-angle lens system A includes a negative front group AF, a first prism (a first reflector) AP1, a stop AS, a second prism (a second reflector) AP2, a positive rear group AR, and a third prism (a third reflector) AP3, which are arranged in that order from the object side to the image side. The negative front group AF is capable of capturing light rays with wide angles of view of 180 degrees or more, and the positive rear group AR is capable of correcting aberrations of an image formed by the lens system A. The stop AS is illustrated in the exploded view of FIG. 4.

Figure 4:
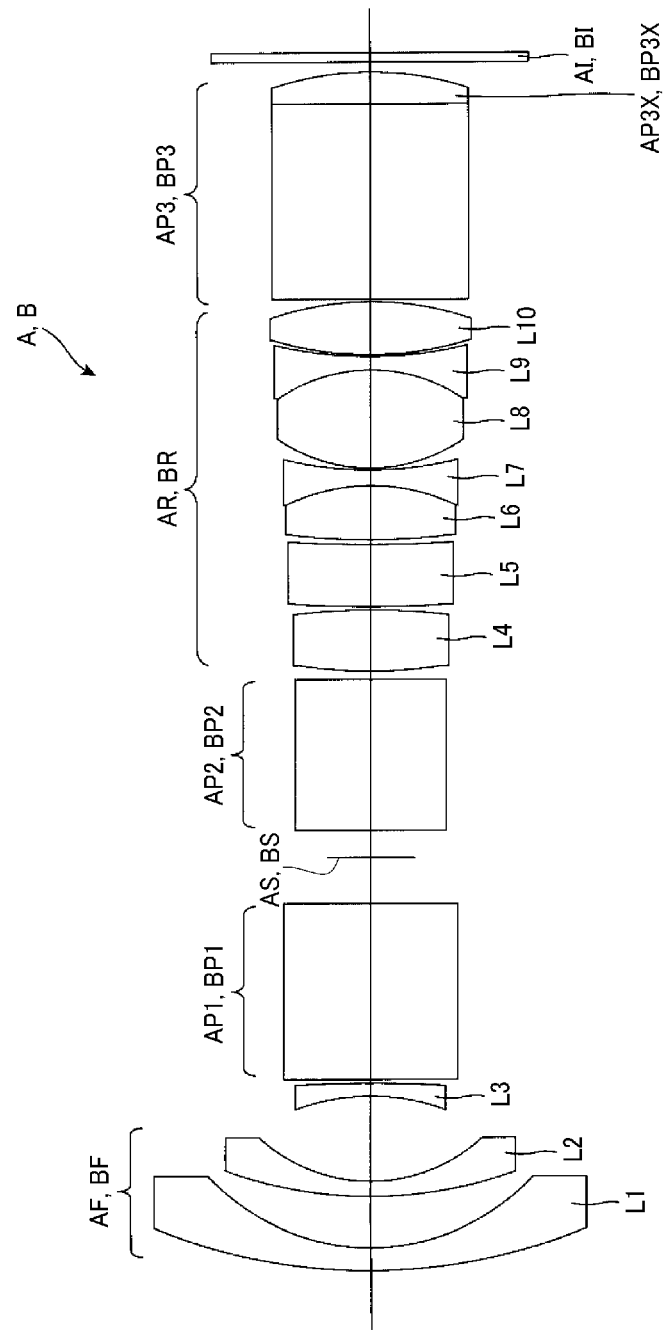
FIG. 4 is an exploded view of a wide-angle lens system and an image sensor.

The negative front group AF diverges a light beam of an object that has struck the front group AF from the front side (the front group AF side as illustrated in FIG. 1) while causing the diverging light beam to travel backward (to the front group BF side as illustrated in FIG. 1). The first prism AP1 reflects the light beam that has passed through the negative front group AF and struck the thirst prism AP1, to the left by 90 degrees. The stop AS sets the transmissive amount of light rays reflected by the first prism AP1. The second prism AP2 reflects the light beam, whose transmissive amount has been set by the stop AS, downward by 90 degrees. The positive rear group AR converges the light beam reflected by the second prism AP2 while causing the converging light beam to travel downward. The third prism AP3 reflects the light beam that has passed through the positive rear group AR and struck the third prism AP3, to the right by 90 degrees, and the reflected light beam forms an image on an imaging plane of the image sensor AI. The third prism AP3 has a convex surface AP3X (an exit surface) that projects toward the imaging plane of the image sensor AI. Each of the negative front group AF and the positive rear group AR (in FIGS. 1 to 3) includes a plurality of lenses as illustrated in FIG. 4.

The wide-angle lens system B includes a negative front group BF, a first prism (a first reflector) BP1, a stop BS, a second prism (a second reflector) BP2, a positive rear group BR, and a third prism (a third reflector) BP3, which are arranged in that order from the object side to the image side. The negative front group BF is capable of capturing light rays with wide angles of view of 180 degrees or more, and the positive rear group BR is capable of correcting aberrations of an image formed by the lens system B.

The negative front group BF diverges a light beam of an object that has struck the front group BF from the back side (the front group BF side as illustrated in FIG. 1) while causing the diverging light beam to travel forward (to the front group BF side as illustrated in FIG. 1). The first prism BP1 reflects the light beam that has passed through the negative front group BF and struck the first prism BP1, to the right (as illustrated in FIG. 2) by 90 degrees. The stop BS sets the transmissive amount of the light beam reflected by the first prism BP1. The second prism BP2 reflects the light beam, whose transmissive amount has been set by the stop BS, downward by 90 degrees. The positive rear group BR converges the light beam reflected by the second prism BP2 while causing the converging light beam to travel downward. The third prism BP3 reflects the light beam that has passed through the positive rear group BR and struck the third prism BP3, to the right by 90 degrees, and the reflected light beam forms an image on an imaging plane of the image sensor BI. The third prism BP3 has a convex surface BP3X (an exit surface) that projects toward the imaging plane of the image sensor BI. Each of the negative front group BF and the positive rear group BR (in FIGS. 1 to 3) includes a plurality of lenses as illustrated in FIG. 4.

In the wide-angle lens system A, the imaging plane of the image sensor AI faces the left. In the wide-angle lens system B, the imaging plane of the image sensor BI faces the right. The opposite plane of the imaging plane of the image sensor AI is opposed to the opposite plane of the imaging plane of the image sensor BI.

FIG. 4 is an exploded view of each of the wide-angle lens systems A and B and the image sensors AI and BI. In FIG. 4, the reflection directions by the first prism AP1 to the third prism AP3 and the first prism BP1 to the third prism BP3 are not concerned. That is, the configurations of the wide-angle lens system A and the image sensor AI are the same as those of the wide-angle lens system B and the image sensor BI.

In the lens data in FIG. 17, f denotes the focal length of the entirety of the imaging system 1, fNO denotes the F number, and w denotes the angle of view. The surface number ranges from 1 to 28 in order from the object side to the image side, and the surface number represents, for example, the lens surfaces, the incident surface/exit surface of a prism, and the imaging plane of the image sensor.

The symbol "R" denotes the radius of curvature of each surface (paraxial radius of curvature in the aspheric surface), the symbol "D" denotes the distance between surfaces, the symbol "Nd" denotes the refractive index with respect to the d line, and the symbol "vd" denotes the Abbe number with respect to the d line. The distance to an object is infinite. The unit of length, which is a dimension, is mm.

FIG. 17 is a table of lens data.

The mark "*" is given to an aspherical surface in the lens data. An aspherical surface is defined by the following equation:

$$X=\{CH^2/[1+\sqrt{(1-(1+K)C^2H^2)}]\}+A4 \cdot H^4+A6 \cdot H^6+A8 \cdot H^8+A10 \cdot H^{10}+A12 \cdot H^{12}+A14 \cdot H^{14}+A16 \cdot H^{16}$$

where the symbol "C" denotes an inverse number of a paraxial radius of curvature (a paraxial curvature), the symbol "H" denotes the height from the optical axis, the symbol "K" denotes a conic constant of an aspherical surface, the symbol "Ai" denotes an aspherical surface coefficient of the i-th order, and the symbol "X" denotes the degree of asphericity along the optical axis.

The paraxial radius of curvature R, the conical constant K, and the aspherical coefficients A1 to A16 are given to define the shape of a lens.

FIG. 18 is a table of aspherical surface data of the wide-angle lens system according to the embodiments of the present disclosure.

In the aspherical surface data in FIG. 18, "E-a" denotes "×10-a". Further, "4th to 16th" denote "A4 to A16", respectively.

Each of the negative front groups AF and BF includes a negative meniscus lens L1 with a convex surface facing the object side, a negative meniscus lens L2 with a convex surface facing the object side, and a negative biconcave lens L3, which are arranged from the object side to the image side. The negative meniscus lens L2 has an aspheric surface on each side. The negative biconcave lens L3 has an aspheric surface on each side.

Each of the positive rear groups AR and BR includes a positive biconvex lens L4, a positive meniscus lens L5 with a convex surface facing the object side, a positive biconvex lens L6, a negative biconcave lens L7, a positive biconvex lens L8, a negative biconcave lens L9, and a positive biconvex lens L10, which are arranged from the object side to the image side. The positive biconvex lens L4 has an aspherical surface on each side. The positive meniscus lens L5 has an aspherical surface on each side. The positive biconvex lens L10 has an aspherical surface on the image side. The positive biconvex lens L6 and the negative biconcave lens L7 are cemented to each other. The positive biconvex lens L8 and the negative biconcave lens L9 are cemented to each other.

The above-described configurations of the negative front groups AF, BF and the positive rear groups AR, BR are merely examples, and the configurations of the negative front groups AF, BF and the positive rear groups AR, BR can be changed in design. In addition, the front groups AF and BF may have positive power instead of negative power, and the rear groups AR and BR may have negative power instead of positive power.

In the imaging system 1 configured as described above, the negative front group AF of the wide-angle lens system A and the negative front group BF of the wide-angle lens system B are arranged facing opposite directions along the front-to-back direction, i.e., the shared optical axis between the wide-angle lens system A and the wide-angle lens system B. The wide-angle lens system A/B is bent by 90 degrees using the first prism AP1/BP1 and the second prism AP2/BP2 so that the positive rear group AR and the positive rear group BR are separated from each other along right-to-left direction, extending in parallel along the up-to-down direction of the casing 10. The image sensor AI is disposed next to the third prism AP3 bending the optical axis of the wide-angle lens system A to the right by 90 degrees. The image sensor BI is disposed next to the third prism BP3 bending the optical axis of the wide-angle lens system B to the left by 90 degrees. Thus, the imaging plane of the image sensor AI and imaging plane of the image sensor BI are opposed to each other along the right-to-left direction. In other words, the planes opposite to the imaging planes of the image sensors AI and BI face in opposite directions. When the imaging system 1 is mounted on the casing 10, the lens closest to the object side within the negative front group AF projects forward beyond the casing 10 (exposed to the outside of the casing 10). Further, the lens closest to the object side within the negative front group BF projects backward beyond the casing 10 (is exposed to the outside of the casing 10). Further, the other components are housed in the casing 10.

That is, the wide-angle lens systems A and B include the front groups AF and BF, respectively, which are opposed to each other along the front-to-back direction of the casing 10 in the upper portion of the casing 10. Further, the wide-angle lens systems A and B include the rear groups AR and BR, respectively that extend in parallel along the up-to-down direction of the casing 10. As described above, the wide-angle lens systems A and B include the first prisms AP1 and BP1 (a first reflector), the second prisms AP2 and BP2 (a second reflector), and the third prisms AP3 and BP3 (a third reflector), respectively. In the upper portion of the casing 10, each of the first prisms AP1 and BP1 changes the direction of travel of (reflects) the light beam (of an object) that has passed through the (corresponding) front group AF/BF, to the right or left of the right-to-left direction. In the upper portion of the casing 10, each of the second prisms AP2 and BP2 changes the direction of travel of (reflects) the light beam that has passed through the (corresponding) first prisms AP1/BP1 (the first reflector) upward or downward along the up-to-down direction. Further, in the lower portion of the casing 10, each of the third prisms AP3 and BP3 (the third reflector) changes the direction of travel of (reflects) the light beam that has passed through the (corresponding) rear group AR/BR to the right or left along the right-to-left direction. With this configuration, the imaging optical systems A and B or the imaging system 1 can be arranged in the casing 10 with a better layout efficiency, which achieves a reduction in the size of the apparatus.

The two wide-angle lens systems A and B and/or the image sensors AI and BI define a plane between opposed lenses (for example, lenses closest to the object side) and a space between the opposed lenses.

For example, the plane between opposed lenses is a (virtual) plane orthogonal to the shared optical axis between the negative front group AF of the wide-angle lens system A and the negative front group BF of the wide-angle lens system B and/or a (virtual) plane that includes both of the optical axis of the positive rear group AR of the wide-angle lens system A and the optical axis of the positive rear group BR of the wide-angle lens system B. In the embodiments of the present disclosure, the virtual plane that includes each of the right-to-left direction and the up-to-down direction corresponds to the plane between the opposed lenses. For example, the drawing sheet of FIG. 2 corresponds to the plane between the opposed lenses.

The space between the opposed lenses is defined as a space formed between the plane (including the surface closest to the object side) orthogonal to the optical axis of the negative front group AF of the wide-angle lens system A and the plane (including the surface closest to the object side) orthogonal to the optical axis of the negative front group BF of the wide-angle lens system B. The space between the opposed lenses is illustrated in FIG. 1.

The first prism AP1 to the third prism AP3 of the wide-angle lens system A and the first prism BP1 to the third prism BP3 of the wide-angle lens system B are disposed within the plane between the opposed lenses and/or the space between the opposed lenses. Within the plane between the opposed lenses and/or the space between the opposed lenses, the optical path of the light rays traveling to the image sensor AI changes (the light rays traveling to the image sensor AI is reflected) three times (that is, is re-directed at least twice) using the prisms AP1 to AP3. Within the plane between the opposed lenses and/or the space between the opposed lenses, the optical path of the light rays traveling to the image sensor BI (the light rays traveling to the image sensor BI is reflected) is changed three times (at least twice) using the prisms BP1 to BP3. More specifically, the first prism AP1 to the second prism AP2 of the wide-angle lens system A reflect (change the direction of) the light from the object twice between the negative front group AF and the positive rear group AR. Further, the first prism BP1 to the second prism BP2 of the wide-angle lens system B reflect (change the direction of) the light from the object twice between the negative front group BF and the positive rear group BR. The third prism AP3 of the wide-angle lens system A reflects (changes the optical path of) the light from the object once between the positive rear group AR and the image sensor AI. The third prism BP3 of the wide-angle lens system B reflects (changes the optical path of) the light from the object once between the positive rear group BR and the image sensor BI.

With such a configuration, the optical path to the image sensor AI/BI is bent multiple times in different directions within the plane between the opposed lenses and/or the space between the opposed lenses defined by the wide-angle lens systems A and B and/or the image sensors AI and BI. As a result, the optical-path length of each of the wide-angle lens systems A and B can be increased. Further, such a configuration can reduce the distance (the distance between maximum angle-of-view points) between the position at which the light rays forming a maximum angle of view strike the lens closest to the object side (the lens closest to the front of the negative front group AF) in the wide-angle-lens system A and the position at which the light rays forming a maximum angle of view strike the lens closest to the object (the lens closest to the front of the negative front groups BF) side in the wide-angle-lens system B. Such a distance is referred to as the distance between maximum angle-of-view points as illustrated in FIG. 1. As a result, the image sensors AI and BI can be increased in size and the imaging system 1 can be reduced in size. Further, the disparity that corresponds to an overlapping area of two images to be joined by calibration is reduced, thus obtaining high-quality images.

The two lenses L1 closest to the object side in the two wide-angle lens systems A and B, respectively, are disposed facing different directions from each other. More specifically, the lens L1 closest to the object side in the wide-angle lens system A receives light traveling from the front to the back direction along the front-to-back direction, and the lens L1 closest to the object side in the wide-angle lens system B receives light traveling from the back to the front direction along the front-to-back direction.

The first prism AP1 to the third prism AP3 (reflectors) of the wide-angle lens system A are configured to change the directions (optical paths) in which the light rays travel to the image sensor AI within the space between the planes each orthogonal to the optical axis of the lens L1 disposed closest to the object side in the wide-angle lens system A. The first prism BP1 to the third prism BP3 (reflectors) of the wide-angle lens system B are configured to change the directions (optical paths) in which the light rays travel to the image sensor BI within the space between the planes each orthogonal to the optical axis of light passing through the lens L1 disposed closest to the object side in the wide-angle lens system B. In other words, each reflector (AP1, AP2, AP3, BP1, BP2, and BP3) is configured to reflect the light traveling to the corresponding image sensor (AI or BI) within the space between planes, each of the planes orthogonal to the optical axis of the lens L1 disposed closest to the object side.

The first prism AP1 of the wide-angle lens system A and the first prism BP1 of the wide-angle lens system B are configured to change the optical paths (directions) of the light rays in directions different from each other. More specifically, the first prism AP1 of the wide-angle lens system A changes, to the left, the optical path (which is an optical path of light to be reflected by the first prism AP1) of light rays traveling from the front to the back of the wide angle lens system A. The first prism BP1 of the wide-angle lens system B changes, to the right, the optical path (which is an optical path of light to be reflected by the first prism PB1) of light rays traveling from the back to the front.

The second prisms AP2 and BP2 of the wide-angle lens systems A and B are configured to change the respective optical paths to the same direction. More specifically, the second prism AP2 of the wide-angle lens system A changes downward the optical path (which is an optical path of light to be reflected by the second prism AP2) of light rays traveling the right to the left along the right-to-left direction. The second prism BP2 of the wide-angle lens system B changes downward the optical path (which is an optical path of light to be reflected by the second prism BP2) of light rays traveling the left to the right along the right-to-left direction.

The first prism AP1 of the wide-angle lens system A and the first prism BP1 of the wide-angle lens system B are transparent members which are optically equivalent to each other, and each of the first prism AP1 and the prism BP1 has a reflecting plane (reflector). The first prism AP1 and the first prism BP1 are disposed such that the respective reflecting planes of the first prism AP1 and the first prism BP1 are opposed to each other. In this case, the respective reflecting planes of the first prism AP1 and the first prism BP1 may not be parallel to each other. Further, it is desired that either one of the respective reflecting planes of the first prism AP1 and the first prism BP1 at least partly overlaps the other reflecting planes when viewed from a direction vertical to the one reflecting plane. At this time, a reflective layer may be disposed between the reflecting planes. The reflective layer may be formed on each of the reflecting planes or may be common between the reflecting planes. In the present embodiments, the reflecting planes are away from each other, facing each other. However, in some embodiments, the reflecting planes may be in contact with each other or may be bonded to each other by an adhesive. When a reflective layer is formed on each of the reflecting planes, the reflecting planes may be in contact with each other or bonded to each other with an adhesive so as to face each other. Alternatively, the reflective layers may be away from each other, facing each other. The expression "the reflecting planes are (or the reflective layers may be) away from each other" means that the reflecting planes or the reflective layers are opposed to each other (face each other) without being in contact with each other. As described above, the first prism AP1 of the wide-angle lens system A and the first prism BP1 of the wide-angle lens system B are provided so that the respective reflecting planes or reflective layers are opposed to each other. This configuration can reduce the width of each of the wide-angle lenses A and B in the direction of the optical axis of light striking the wide-angle lens systems A and B.

The stop AS is disposed between the first prism AP1 and the second prism AP2 of the wide-angle lens system A. The stop BS is disposed between the first prism BP1 and the second prism BP2 of the wide-angle lens system B. The first prism AP1 and the second prism AP2 are disposed close to the stop AS that sets the amount of light. Further, the first prism BP1 and the second prism BP2 are disposed close to the stop BS that sets the amount of light. With such an arrangement, small right-angle prisms are used so that the distance between the wide-angle lens system A and the wide-angle lens system B can be reduced. Further, such an arrangement provides a symmetrical configuration in which the first prism AP1 and the second prism are disposed on the front and back sides of the stop AS, respectively, the negative front group AF is disposed on the front side of the first prism AP1, and the positive rear group AR is disposed on the back side of the second prism AP2. Further, the same symmetrical configuration is also provided in the wide-angle lens system B in which the first prism BP1 and the second prism are disposed on the front and back sides of the stop BS, respectively, the negative front group BF is disposed on the front side of the first prism BP1, and the positive rear group BR is disposed on the back side of the second prism BP2.

Note that examples of the stops AS and BS include a fixed aperture stop with a fixed aperture to set in advance the amount of light that passes through the stops AS and BS, and a variable aperture stop with a variable aperture to vary the amount of light that passes through the stops AS and BS. Setting the amount of light means determining the amount of light that passes through the stops AS and BS depending on the size of the aperture of the stop. When setting the amount of light that passes through the fixed aperture stop, the amount of light that passes through the stop is constant because the size of the aperture of the fixed aperture stop is set in advance. When setting the amount of light that passes through the variable aperture stop, the amount of the light that passes through the variable aperture stop is set for each shooting by user's manual operation to vary the size of the aperture (a manual light amount setting) or the amount of light that passes through the variable aperture stop is automatically set for each shooting by varying the aperture based on the output of the image sensor (an automatic light amount setting). In the present embodiment, the stops AS and BS are positioned between the first prism AP1 and BP1 and the second prism AP2 and BP2. However, in some embodiments, the stops AS and BS may be disposed in front of the first prism AP1 and BP1, in back of the second prism AP2 and BP2, or in front/back of the third prism AP3, BP3, respectively. Further, the stops AS and BS may not be disposed in immediately front of the prism, but may be disposed in the vicinity of the prism. It is satisfactory that the stops AS and BS are disposed between the lenses of the rear group (for example, between the lenses L4 and L5 of the rear group) as long as the above-described effects are exhibited. In the present embodiment, the number of stops is one for each of angle lens systems A and B, but there may be plural prisms in each wide angle lens. For example, a first stop may be disposed between the first prism AP1/BP1 and the second prism AP2/BP2, and a second stop may be disposed after the third prism AP3/BP3.

A description is given below of the automatic light-amount setting using the variable aperture stops AS and BS as an example of the light amount setting using a stop according to an embodiment of the present disclosure. The aperture size of the variable aperture stop AS and the variable aperture stop BS are set based on the outputs of the image sensor AI and the image sensor BI. For example, when the imaging apparatus equipped with the imaging system 1 is used outside, sunlight might enter only one of the wide angle lens systems A and B. In such a case, the brightness (degree of exposure) significantly differs between the wide-angle lens systems A and B. In such a state, an unnatural-looking spherical image in which the boundary between bright portions and dark portions are reflected is obtained by combining the images formed by the image sensor AI and the image BI whose brightness (degree of exposure) differs between each other. In view of such a situation, when sunlight enters only one of the wide-angle lens systems A and B, the diameter of the variable aperture stop of one wide-angle lens system into which sunlight has entered is reduced more than the diameter of the variable aperture stop of the other wide-angle lens system does, so as to make the brightness (the degree of exposure) of the wide-angle lens systems A and B the same. Thus, a natural-looking spherical image, in which there is no boundary between bright portions and dark portions, can be obtained.

The third prism AP3 of the wide-angle lens system A has a convex surface (aspherical surface) AP3X projecting toward the image sensor AI. The third prism BP3 of the wide angle lens system B has a convex surface (aspherical surface) BP3X protruding toward the image sensor BI. Since the wide-angle lens systems A and B have short focal lengths, the back focal length might become long despite the short focal length when the last surface closest to the image side within each of the wide-angle lens systems A and B is curved. In order to avoid such a situation, the convex surface AP3X and the convex surface BP3X are provided on the third prism AP3 and the third prism BP3, respectively to change the positions from which light rays emit. The convex surfaces AP3X and BP3X may be convex surfaces formed by processing the exit surfaces of the prisms AP3 and BP3, respectively. Alternatively, the convex surfaces AP3X and BP3X may be separate convex lenses of the exit surfaces of the prisms AP3 and BP3 and may be attached to the exit surfaces of the prisms AP3 and BP3. Alternatively, a separate convex lens may be disposed after (following) each of the prisms AP3 and BP3.

Second Embodiment

Figure 5:
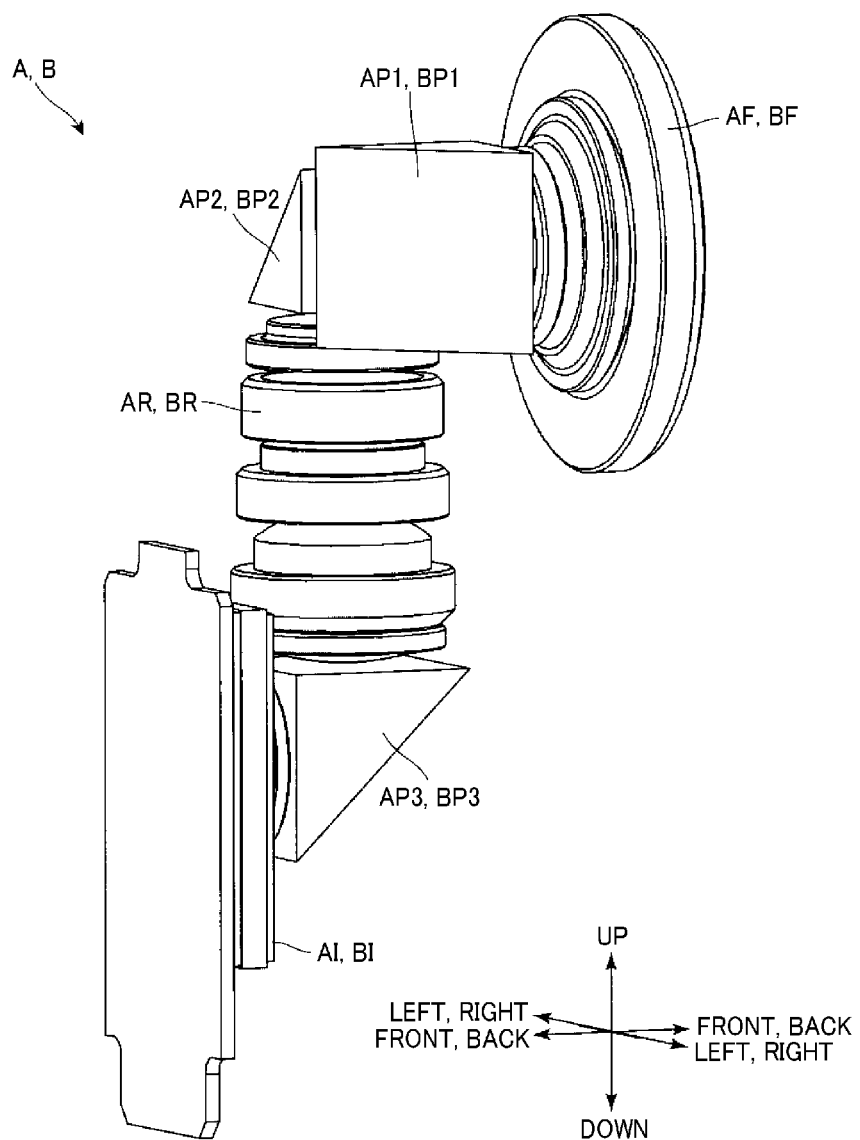
FIG. 5 is a perspective view of a wide-angle lens system and an image sensor of an imaging system according to a second embodiment of the present disclosure.

FIG. 5 is a perspective view of the wide-angle lens systems A and B and the image sensors AI and BI of the imaging system 1 according to the second embodiment of the present disclosure. FIG. 5 is also an illustration of one set of the wide-angle lens system A/B and the image sensor AI/BI in which each lens closest to the object side faces a different direction.

In the second embodiment, the third prism AP3 of the wide-angle lens systems A reflects the light beam in a direction different from the direction in which the third prism AP3 of the wide-angle lens system AS reflects the light beam in the first embodiment. Further, in the second embodiment, the third prism BP3 of the wide-angle lens system B reflects the light beam in a direction different from the direction in which the third prism BP3 of the wide-angle lens system B in the first embodiment. Specifically, the third prism AP of the wide-angle lens system A reflects backward by 90 degrees the light beam that has passed through the positive rear group AR and struck the third prism AP, and the third prism BP of the wide-angle lens system B reflects forward by 90 degrees the light beam that has passed through the positive rear group BR and struck the third prism BP. With this configuration, the image sensors AI and BI are disposed within the distance between the maximum-angle-of-viewpoints so that the imaging planes of the image sensors AI and BI face directions opposite to each other along the direction (front-to-back direction) of thickness of the imaging system 1. Thus, the distance between the maximum-angle-of-view points can be further reduced.

Third Embodiment

Figure 6:
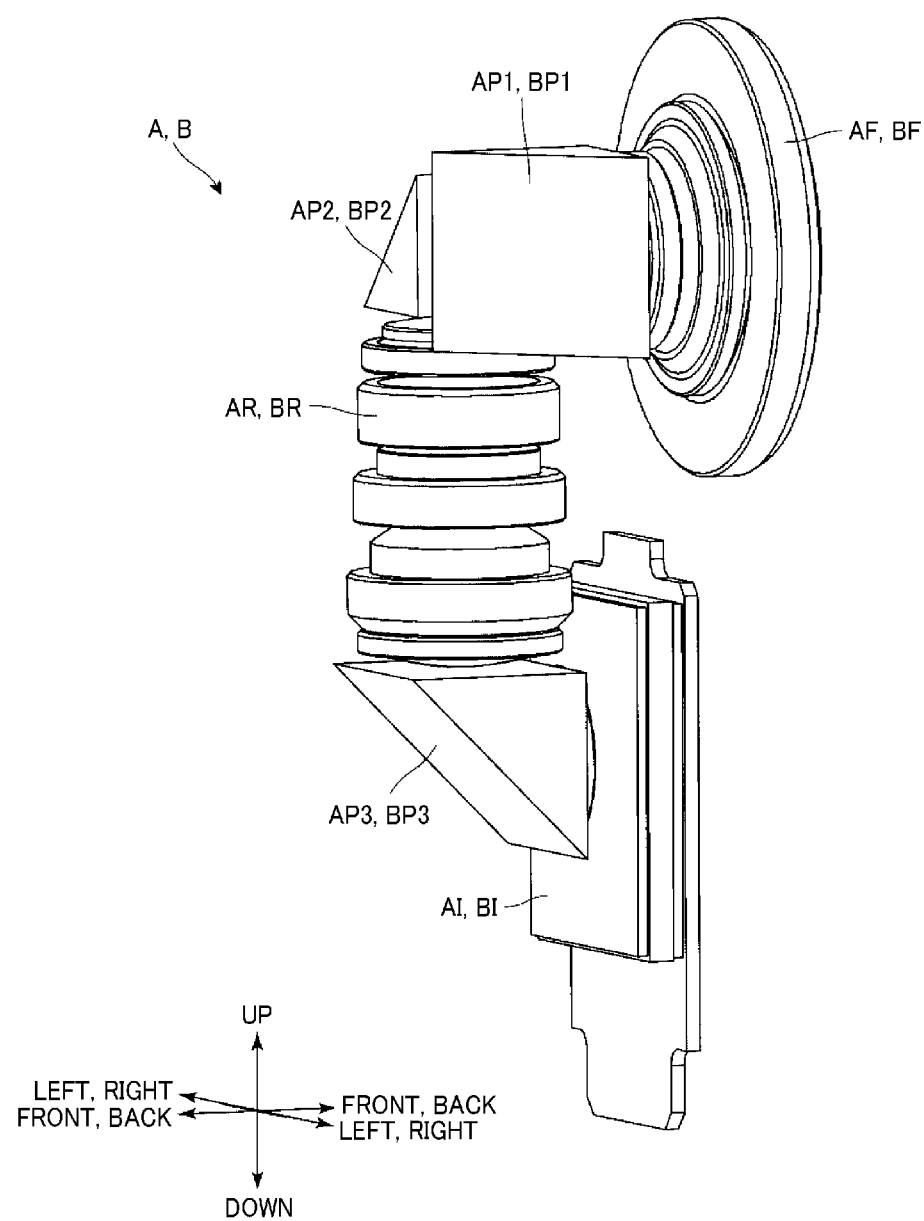
FIG. 6 is a perspective view of a wide-angle lens system and an image sensor of an imaging system according to a third embodiment of the present disclosure.

FIG. 6 is a perspective view of the wide-angle lens systems A and B and the image sensors AI and BI of the imaging system 1 according to the second embodiment of the present disclosure. FIG. 6 is also an illustration of one set of the wide-angle lens system A/B and the image sensor AI/BI in which each lens closest to the object side faces a different direction.

In the third embodiment, the third prism AP3 of the wide-angle lens system A reflects the light beam in a direction different from the direction in which the third prism AP3 of the wide-angle lens system A reflects the light beam in the first and second embodiments. Further, in the third embodiment, the third prism BP3 of the wide-angle lens system B reflects the light beam in a direction different from the direction in which the third prism BP3 of the wide-angle lens system B reflects the light beam in the first and second embodiments. Specifically, the third prism AP of the wide-angle lens system A reflects forward by 90 degrees the light beam that has passed through the positive rear group AR and struck the third prism AP, and the third prism BP of the wide-angle lens system B reflects backward by 90 degrees the light beam that has passed through the positive rear group BR and struck the third prism BP. With this configuration, the image sensors AI and BI are disposed within the distance between the maximum-angle-of-viewpoints so that the imaging planes of the image sensors AI and BI face directions opposite to each other along the direction (front-to-back direction) of thickness of the imaging system 1. Thus, the distance between the maximum-angle-of-view points can be further reduced.

Fourth Embodiment

Figure 7:
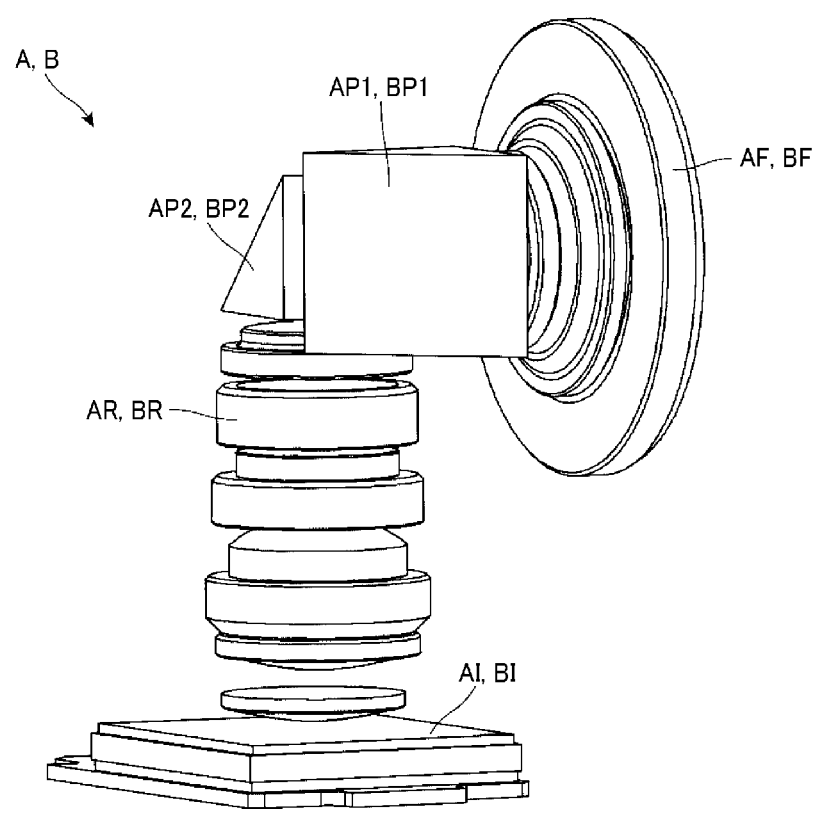
FIG. 7 is a perspective view of a wide-angle lens system and an image sensor of an imaging system according to a fourth embodiment of the present disclosure.

FIG. 7 is a perspective view of the wide-angle lens systems A and B and the image sensors AI and BI of the imaging system 1 according to the fourth embodiment of the present disclosure. FIG. 7 is also an illustration of one of the two sets of the wide-angle lens system and the image sensor in which each lens closest to the object side faces a different direction.

In the fourth embodiment, the third prisms AP3 and BP3 are not included in the wide-angle lens systems A and B, and the light from the object that has passed through the positive rear groups AR and BR is guided directly to the image sensors AI and BI. The configuration according to the fourth embodiment achieves a reduction in the number of components and a reduction in cost due to the elimination of the third prism AP3 and BP3 from the wide-angle lens systems A and B. Without the third prisms AP3 and BP3, the first prism AP1 to the second prism AP2 of the wide-angle lens system A and the first prism BP1 to the second prism BP2 of the wide-angle lens system B reflect the light beam (changes the direction of the light beam) within the above-described plane between the opposed lenses and/or the space between the opposed lenses. Accordingly, an increase in the sizes of the image sensors AI and BI and a decrease in the size of the imaging system 1 (a slimming down) can be achieved while reducing the distance between the maximum-angle-of-view points, i.e., disparity, thus obtaining a high-quality image.

Variation

In the first to fourth embodiments described above, the first prism AP1 to the second prism AP2 of the wide-angle lens system A reflect (change the direction (optical path) of) the light from the object twice between the negative front group AF and the positive rear group AR. Further, the first prism BP1 to the second prism BP2 of the wide-angle lens system B reflect (change the direction (optical path) of) the light from the object twice between the negative front group BF and the positive rear group BR. In the first to third embodiments, the third prism AP3 of the wide-angle lens system A reflects (changes the direction (optical path) of) the light from the object once between the positive rear group AR and the image sensor AI. The third prism BP3 of the wide-angle lens system B reflects (changes the direction (optical path) of) the light from the object once between the positive rear group BR and the image sensor BI.

However, the wide-angle lens systems A and B may include at least two reflectors, such as prisms, to change the optical path that leads to the image sensors AI and BI (the direction of the light rays traveling to the image sensors AI and BI). For example, in some embodiments, one reflector (for example, one prism) is disposed between the negative front group AF/BF and the positive rear group AR/BR, and another reflector (for example, another prism) is disposed between the positive rear group AR/BR and the image sensors AI/BI.

In the first to fourth embodiments described above, cases in which the imaging system 1 is provided with two wide-angle lens systems A and B are described. However, no limitation is intended thereby. Alternatively, the imaging system 1 may be provided with three or more wide-angle lens systems. In this case, the same number of image sensors as the number of wide-angle lens systems may be mounted on the imaging system 1. Each of at least two wide-angle lens systems of three or more wide-angle lens systems may include at least two reflectors to change two optical paths leading to the corresponding two image sensors.

Figure 8:
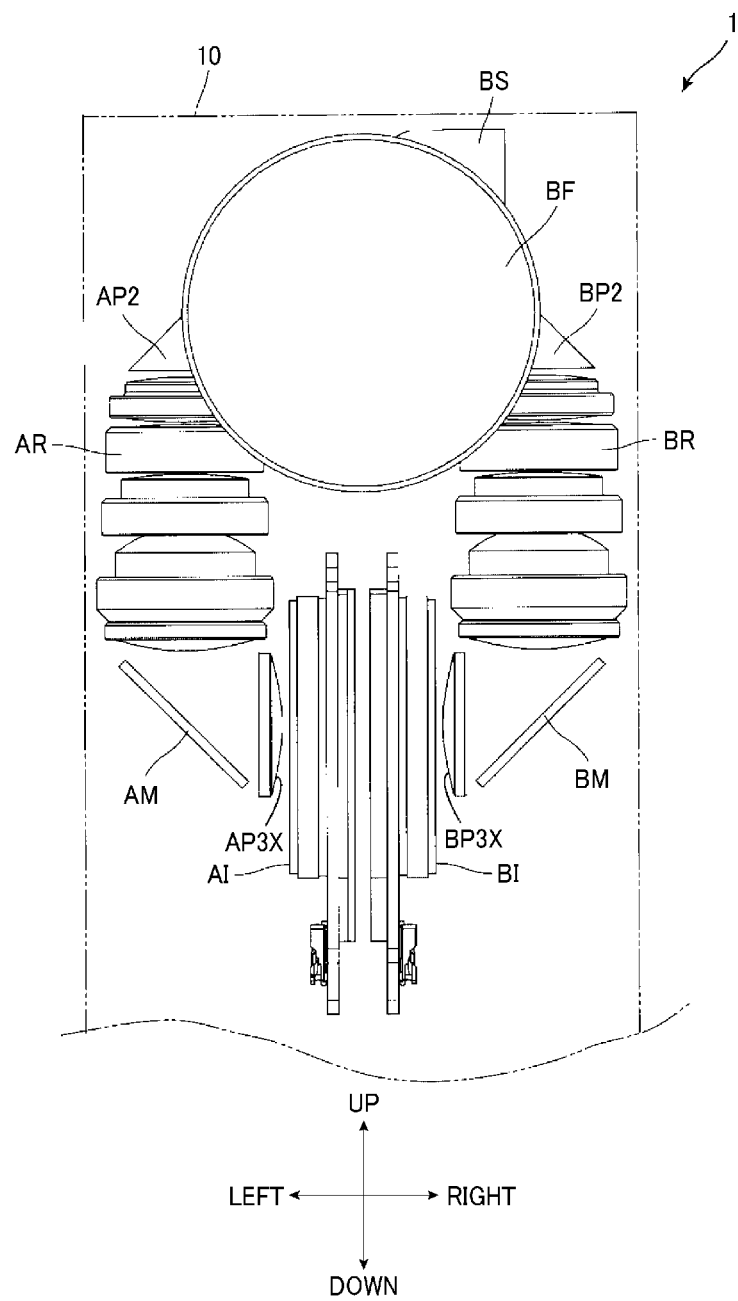
FIG. 8 is an illustration for explaining a variation of an embodiment in which a mirror is used instead of a third prism in FIG. 2.

In the first to fourth embodiments described above, cases in which a prism is employed as a reflector are described. However, no limitation is intended thereby. Examples of the reflector may include a mirror and other kinds of components. FIG. 8 is an illustration for explaining a variation of an embodiment in which a mirror AM/BM is used instead of the third prism AP3/BP3 in the imaging system 1 in FIG. 2.

In the first to fourth embodiments described above, cases in which the two wide-angle lens systems A and B are arranged symmetrically to each other and the image sensors AI and BI are arranged symmetrically to each other are described. However, in some embodiments, the two wide-angle lens systems A and B may not be arranged symmetrically to each other and the image sensors AI and BI may not be arranged symmetrically to each other.

With reference to FIGS. 9A and 9B to FIG. 16, a description is given of the overall configuration of a full-view spherical imaging system to which the imaging system 1 according to an embodiment of the present disclosure is applied.

As illustrated in FIGS. 9A, 9B, 10A, 10B, 11A, and 11B, the imaging system 1 in which components are assembled is held (housed) by the casing 10. The casing 10 is short in the right-to-left direction and long in the up-to-down direction. The casing 10 has a predetermined thickness in the front-to-back direction and has a round top. The casing 10 includes a rear metal casing 20 and a front metal casing 30. The rear metal casing 20 and the front metal casing 30 are made of metal material (for example, magnesium alloy) having higher rigidity (more rigid) than a rear resin casing 70, a front resin casing 80, and a connection resin casing 90 to be described later do. The rear metal casing 20 and the front metal casing 30 are combined as a single molded product.

The rear metal casing 20 and the front metal casing 30 are connected to each other via a left-surface connection casing 40, a right-surface connection casing 50, and a bottom-surface connection casing 60. For example, the left-surface connection casing 40, the right-surface connection casing 50, and the bottom-surface connection casing 60 may be made of the same metal material as those of the rear metal casing 20 and front metal casing 30. However, the material allows for a certain latitude, and various design changes are possible.

A positioning boss is formed on one of the rear metal casing 20 and the front metal casing 30, and a boss insertion hole is formed in the other of the rear metal casing 20 and the front metal casing 30. The positioning boss is inserted into the boss insertion hole so that the rear metal casing 20 and the front metal casing 30 are positioned to be close to each other. The rear metal casing 20 and the front metal casing 30 have screw holes on the left surface, the right surface, and the bottom surface, which fasten the rear metal casing 20 and the front metal casing 30 together in a state that the rear metal casing 20 and the front metal casing 30 are positioned to be close to each other.

The left-surface connection casing 40, the right-surface connection casing 50, and the bottom-surface connection casing 60 are fitted into clearances on the left surface, the right surface, and the bottom surface between the rear metal casing 20 and the front mental casing 30, respectively. Joint fastening screws are inserted through the above-described screw holes to combine the rear metal casing 20, the front metal casing 30, the left-surface connection casing 40, the right-surface connection casing 50, and the bottom-surface connection casing 60 together. Note that there is a certain latitude in combining the rear metal casing 20, the front metal casing 30, the left-surface connection casing 40, the right-surface connection casing 50, and the bottom-surface connection casing 60, and various design changes are possible.

The rear metal casing 20 has a substantially circular lens exposure hole 21 in the upper portion. The front metal casing 30 has a substantially circular lens exposure hole 31 in the upper portion. The front group AF of the wide-angle lens system A is exposed through the lens exposure hole 21, and the front group BF of the wide-angle lens system B is exposed through the lens exposure hole 31. The rear metal casing 20 has a shutter button (the imaging function unit and an operation unit) 22 serving as a trigger for capturing an image (capturing a still image and capturing a moving image) provided slightly below the intermediate portion of the rear metal casing 20 along the up-to-down direction. The rear metal casing 20 further has a display unit (the imaging function unit and a status display unit) 23 for displaying various information of, for example, an operation screen and a setting screen of the imaging system 1, provided below the shutter button 22. The display unit 23 may be, for example, an organic electro luminescence (EL) display.

The left-surface connection casing 40 has, for example, a speaker (the imaging function unit) 41 for issuing, for example, a voice guidance message, provided on the intermediate portion of the left-surface connection casing 40 along the up-to-down direction. The right-surface connection casing 50 has a power button (the imaging function unit and the operation unit) 51 for switching on and off of the power supply of the imaging system 1, provided on the intermediate portion of the right-surface connection casing 50 along the up-to-down direction. The right-surface connection casing 50 further has operation buttons 52, 53, and 54 (the imaging function unit and the operation unit) for setting the shooting mode or the wireless connection moderate, provided below the power button 51.

The rear metal casing 20 further has two microphones (the imaging function unit and the sound collector) 24 on the right side slightly above the shutter button 22, and the microphones are apart from each other along the up-to-down direction. The front metal casing 30 has two microphones (the imaging function unit and the sound collector) 32 slightly above the intermediate portion of the front metal casing 30 along the up-up-to-down direction, and the microphones are apart from each other along right-to-left direction. Thus, these four microphones 24 and 32 provided on the front and back of the casing 10, respectively allow for three-dimensional (3D) voice.

The combination of the rear metal casing 20, the front metal casing 30, the left-surface connection casing 40, the right-surface connection casing 50, and the bottom-surface connection casing 60 constitute a grip portion GP below the intermediate portion of the casing 10 along the up-to-down direction. The photographer is able to press the shutter button 22, the power button 51, and the operation buttons 52 to 54 while holding the grip portion GP.

Further, the combination of the rear metal casing 20, the front metal casing 30, the left-surface connection casing 40, the right-surface connection casing 50, and the bottom-surface connection casing 60 has an opening OS on the top. The opening OS is filled with the rear resin casing 70, the front resin casing 80, and the connection resin casing 90. The rear resin casing 70, the front resin casing 80, and the connection resin casing 90 may be a single molded product made of resin material, such as polycarbonate (PC), acrylonitrile butadiene styrene copolymer (ABS) resin, and mixture of PC and ABS resin, having relatively lower rigidity than the rear metal casing 20 and the front metal casing 30 does.

The rear resin casing 70 has a curved shape to fit into a curved opening portion of the opening OS on the top of the rear metal casing 20. The front resin casing 80 has a curved shape to fit into a curved opening portion of the opening OS on the top of the front metal casing 30. The rear resin casing 70 and the front resin casing 80 form a symmetrical shape facing opposite directions along the front-to-back direction. The connection resin casing 90 has a curved shape to fit into space between the rear resin casing 70 and the front resin casing 80 within the opening OS formed on the top of the rear metal casing 20 and the front metal casing 30.

The rear metal casing 20 has a pair of projecting portions provided with screw holes apart from each other along right-to-left direction, slightly above the lens exposure hole 21. The rear resin casing 70 has a pair of screw insertion holes corresponding to the pair of projecting portions with screw holes. The pair of screw insertion holes and the pair of projecting portions with screw holes are aligned with each other, and a pair of fastening screws are inserted into the pair of screw insertion holes to screw (fasten) into the screw holes of the projecting portions. Thus, the rear metal casing 20 is coupled (connected) to the rear resin casing 70. The same connection structure applies to the front metal casing 30 and the front resin casing 80.

As described above, the imaging unit (optical unit) 100 is formed by combining the wide-angle lens systems A and B (the first prism AP1/BP1 to the third prism AP3/BP3) and the image sensors AI and BI. A screw hole is formed in the imaging unit 100. The imaging unit 100 is assembled by inserting a joint fastening screw into the screw hole and fastening the screw in a state that the imaging unit 100 is housed in the casing 10 (the rear metal casing 20, the front metal casing 30, the left-surface connection casing 40, right-surface connection casing 50, and the bottom-surface connection casing 60). Note that there is a certain latitude in assembling the imaging unit 100 and the casing 10, and various design changes are possible.

Figure 12A:
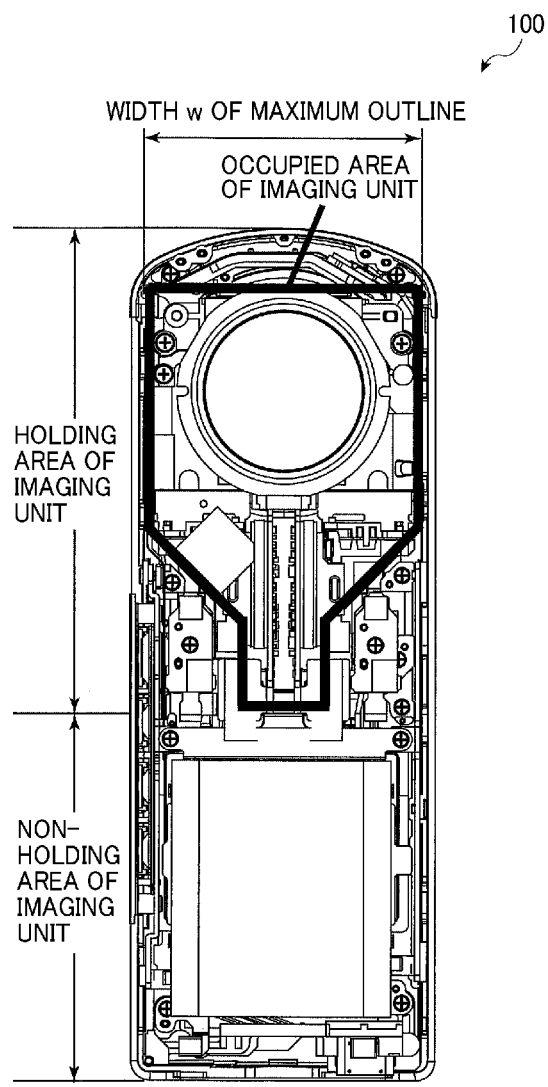
FIGS. 12A and 12B (FIG. 12) are illustrations of relative positions of a casing and an imaging unit combined.
Figure 12A:
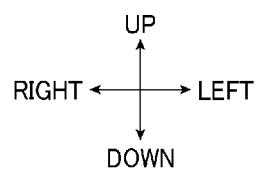
Figure 12B:
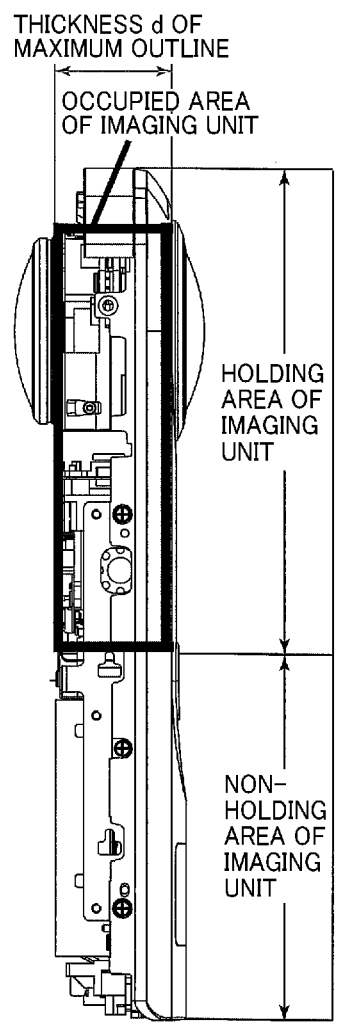
Figure 12B:
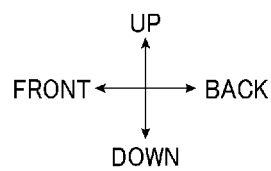

FIGS. 12A and 12B are illustrations of the relative positions of the casing 10 and an imaging unit 100, which are combined. In FIGS. 12A and 12B, an area occupied by the imaging unit 100 in the casing 10 is surrounded by highlighted thick line.

As illustrated in FIGS. 12A and 12B, the casing 10 holding the imaging unit 100 is divided into a holding area for holding the imaging unit 100 in the upper portion of the casing 10 and a non-holding area for not holding the imaging unit 100 in the lower portion of the casing 10 along the up-to-down direction. A part of the imaging unit 100 exposes at least part of the optical systems A and B, i.e., the front lenses (for example, the negative lens L1) of the front groups AF and BF to the outside of the casing 10, defining a maximum outline of the imaging unit 100 except the exposure area. In FIGS. 12A and 12B, w denotes the width (the length in the right-to-left direction) of the imaging unit 100, and d denotes the thickness (the length in the front-to back direction) of the imaging unit 100 in the maximum outline.

Figure 9A:
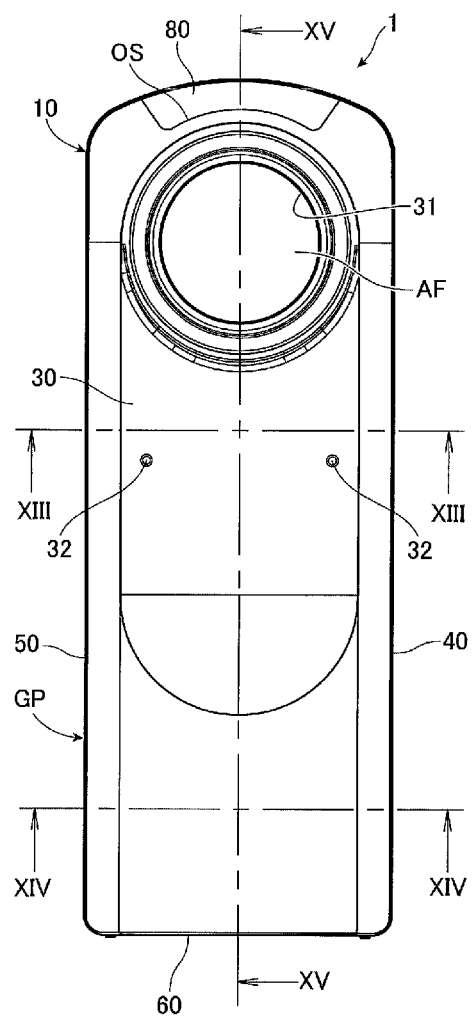
FIGS. 9A and 9B (FIG. 9) are a front view and a rear view, respectively of the imaging system according to an embodiment of the present disclosure.
Figure 9A:
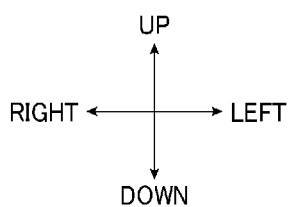
Figure 9B:
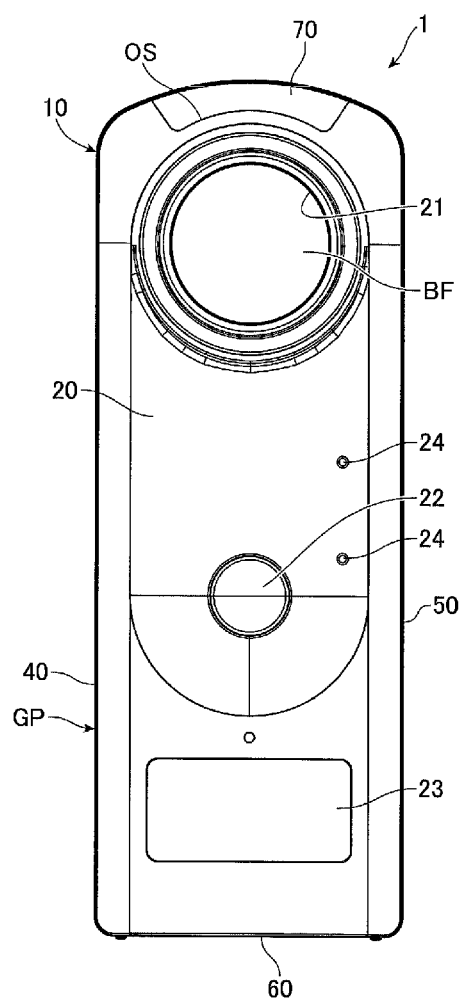
Figure 10A:
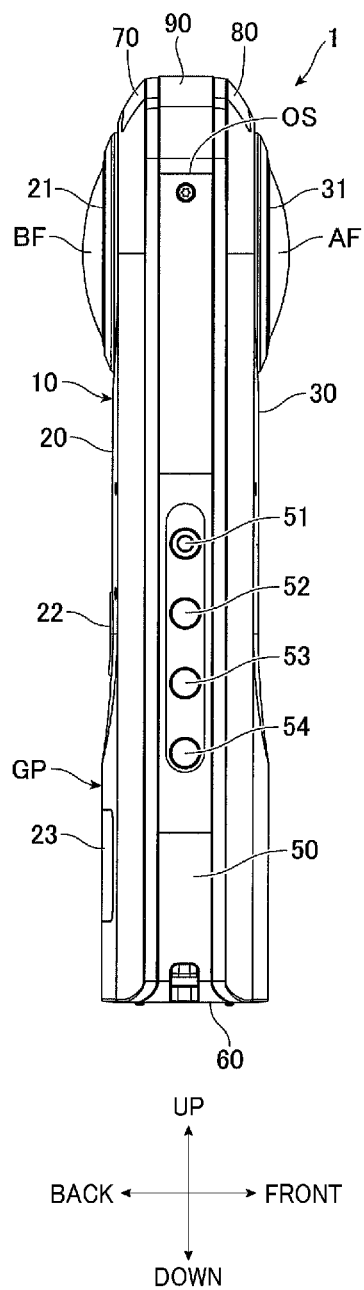
FIGS. 10A and 10B (FIG. 10) are a right-side view and a left-side view, respectively of the imaging system according to an embodiment of the present disclosure.
Figure 10B:
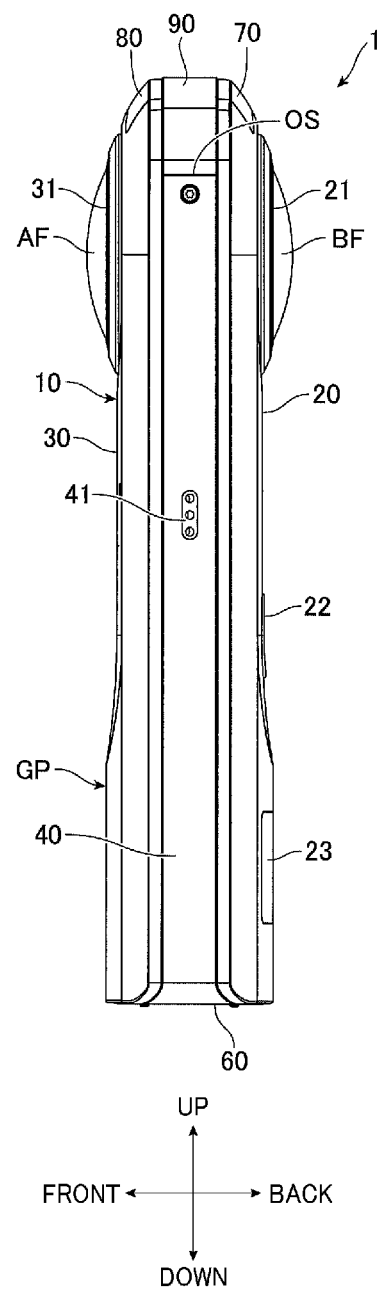
Figure 11A:
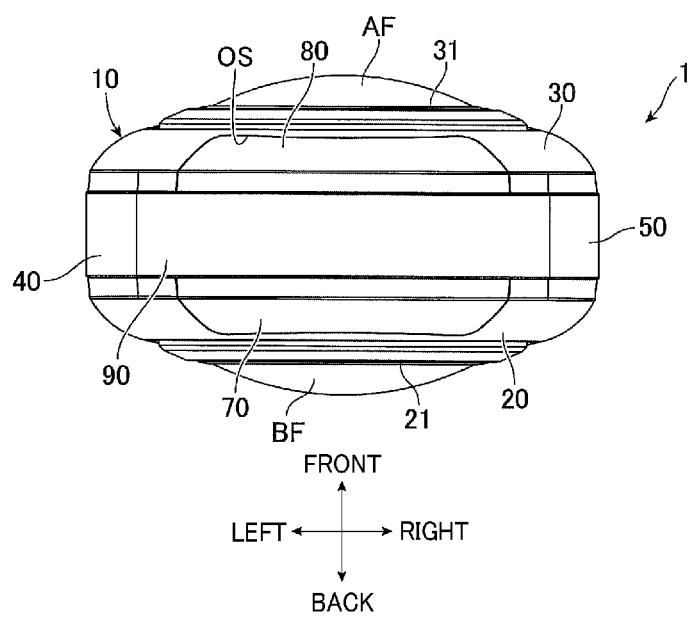
FIGS. 11A and 11B (FIG. 11) are a top view and a bottom view, respectively of the imaging system according to an embodiment of the present disclosure.
Figure 11B:
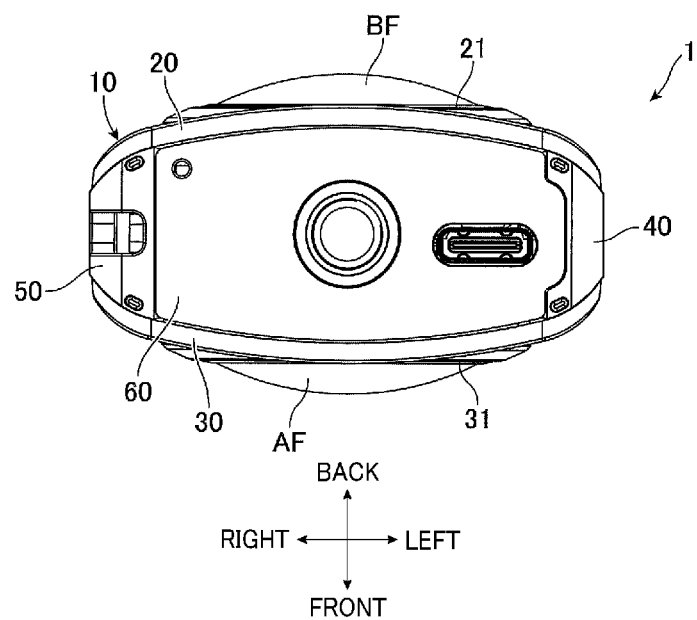
Figure 13:
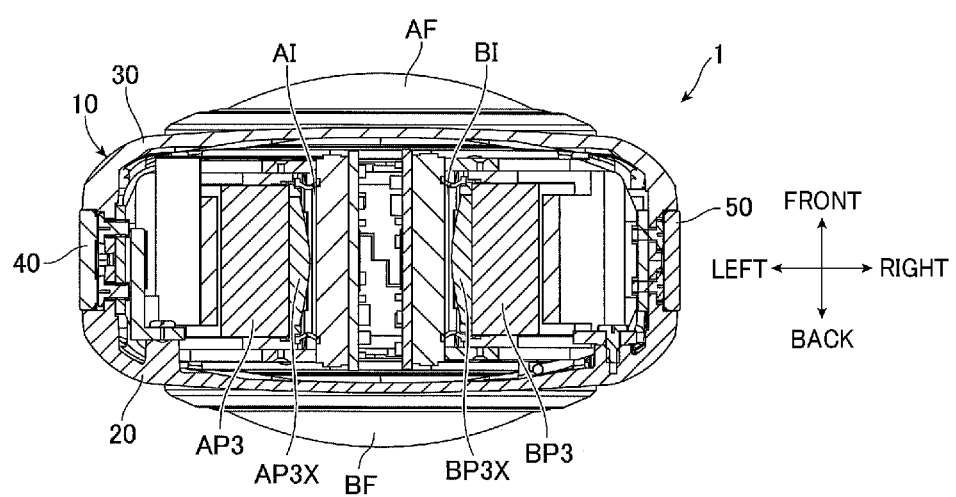
FIG. 13 is a cross-sectional view taken along line XIII-XIII in FIG. 9A.
Figure 14:
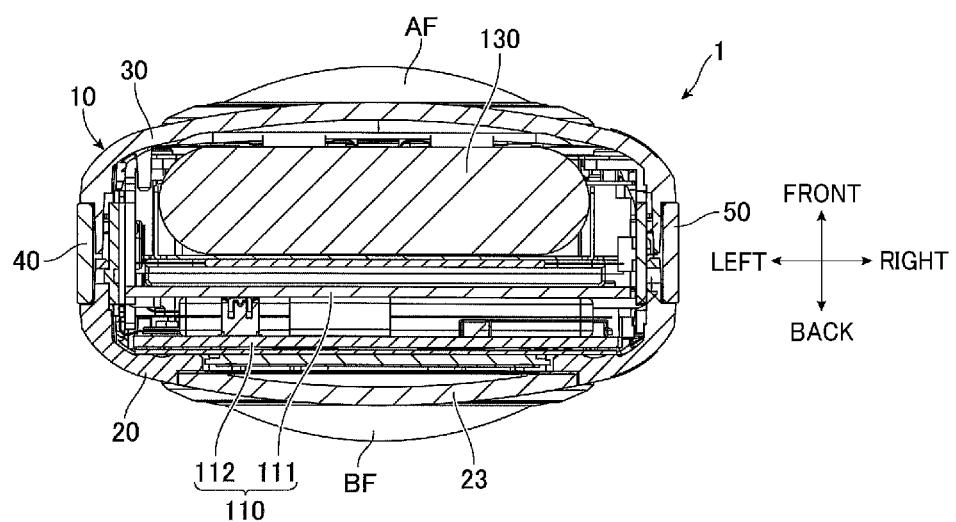
FIG. 14 is a cross-sectional view taken along line XIV-XIV in FIG. 9A.
Figure 15:
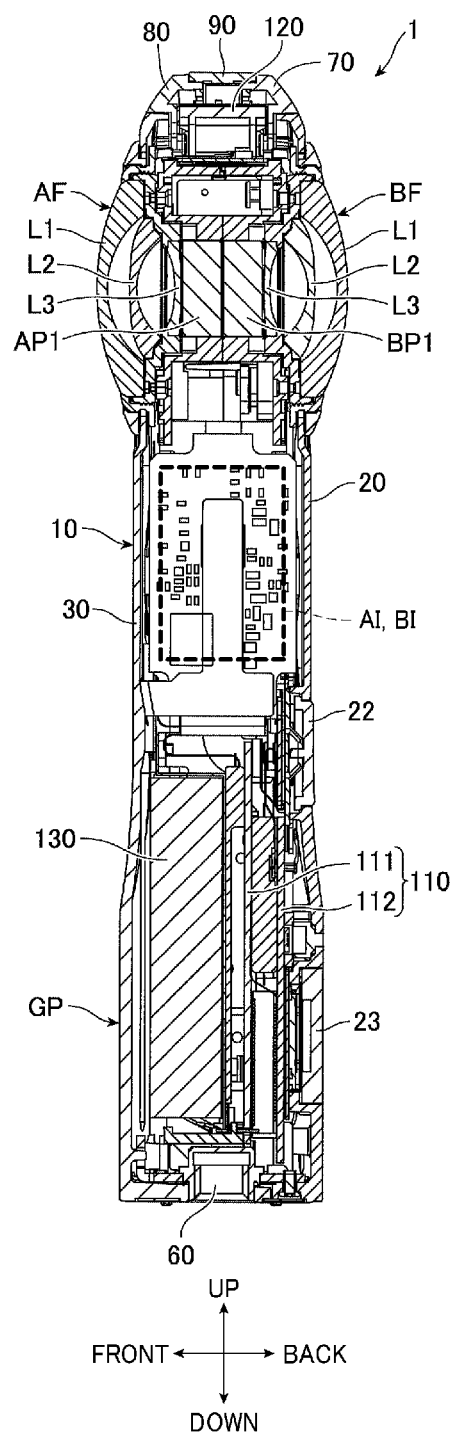
FIG. 15 is a cross-sectional view taken along line XV-XV of FIG. 9A.

FIGS. 13, 14, and 15 are cross-sectional views taken along lines XIII-XIII, XIV-XIV, and XV-XV in FIG. 9.

As illustrated in FIGS. 14 and 15, the non-holding area, in which the imaging unit 100 is not held in the casing 10, holds (houses) a wireless module board (an imaging function unit and a circuit board) 110 that converts imaging signals from the image sensors AI and BI into wireless signals. The wireless module board 110 includes a sub-board 111 on the front side and a main board 112 on the back side, which overlap along the front-to-back direction and electrically coupled to each other. The sub-board 111 forms a relatively small and substantially rectangular shape in plan view, whereas the main board 112 forms a relatively large and substantially rectangular shape in plan view. The main board 112 includes a transmission member that extends upward to the inner space formed by a rear resin casing 70, a front resin casing 80, and a connection resin casing 90. The transmission member may be composed of, for example, a coaxial cable or a flexible printed circuit (FPC).

As illustrated in FIG. 15, a communication antenna (an imaging function unit and an antenna board) 120 is provided within the inner space of the rear resin casing 70, the front resin casing 80, and the connection resin casing 90. One end of the transmission member is connected to the main board 112 and the other end of the transmission member is connected to the communication antenna 120. The transmission member transmits imaging signals from the image sensors AI and BI to the communication antenna 120. The communication antenna 120 wirelessly transmits the imaging signals to an external device. Further, the communication antenna 120 is capable of receiving and transmitting various kinds of signals from and to the external device.

The communication antenna 120 includes an antenna body and an antenna board for supporting the antenna body. The antenna body may be composed of, for example, a FPC or a rigid FPC. The antenna board has a curved shape (circular shape) along the shape of an opening OS formed on the top surface of the casing 10 (the rear metal casing 20, the front metal casing 30, the left-surface connection casing 40, the right-surface connection casing 50, and the bottom-surface connection casing 60). The end of the transmission member is connected to the upper surface of the curved-shape portion to which the antenna body is attached.

As illustrated in FIGS. 14 and 15, the non-holding area, in which the imaging unit 100 is not held in the casing 10, holds (houses) a battery 130 that supplies power to each component of the imaging apparatus. The battery 130 overlaps the wireless module board 110 along the up-to-down direction and is at the front side relative to the wireless module board 110. Further, the image sensors AI and BI are disposed to not overlap the lens L1 closest to the object side when viewed from the direction of the optical axis of light striking the lens L1. The components such as wireless module board 110, the communication antenna 120, and the battery 130 are disposed in an area (the non-holding area) different from the holding area holding the imaging unit 100. This configuration can achieve a reduction in the size of the imaging unit 100 in the up-to-down direction, the right-to-left direction, and the front-to-back direction as much as possible.

Figure 16:
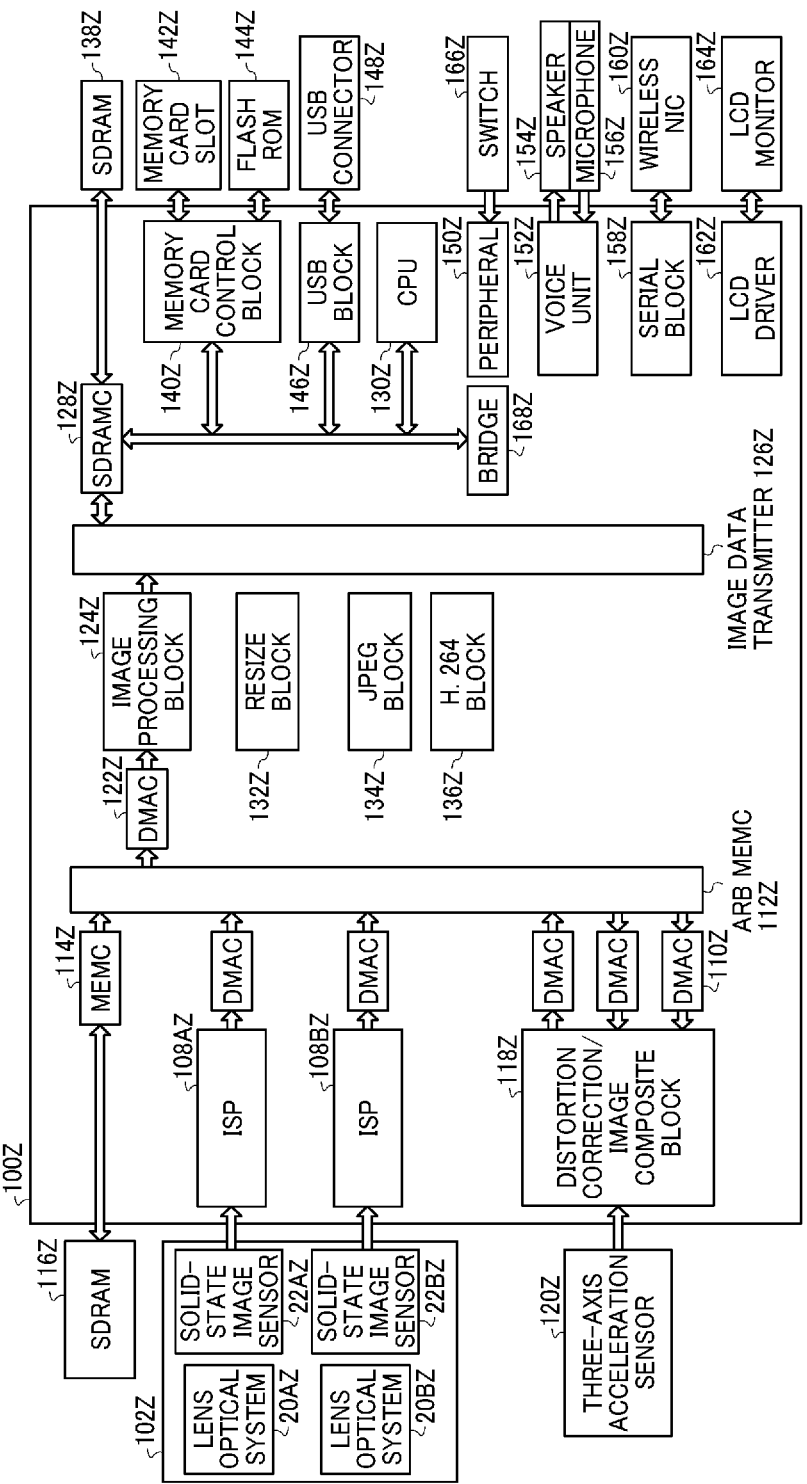
FIG. 16 is a block diagram of a hardware configuration of an imaging system according to an embodiment of the present embodiment.

FIG. 16 is a block diagram of a hardware configuration of the imaging system 1 according to an embodiment of the present disclosure. The imaging system 1 includes a digital still camera processor (hereinafter, simply referred to as a processor) 100Z, a barrel unit 102Z, and various components connected to the processor 100Z. The barrel unit 102Z includes the two lens optical systems 20AZ and 20BZ and the solid-state image sensors 22AZ and 22BZ. The solid-state image sensor 22Z is controlled by a control command from the CPU 130Z in the processor 100Z, which will be described later.

The processor 100Z includes image signal processors (ISPs) 108AZ and 108BZ, a direct memory access controller (DMAC) 110Z, an arbiter (ARBMEMC) 112Z for arbitrating memory access, a memory controller (MEMC) 114Z for controlling memory access, and a distortion correction/image composite block 118Z. The ISPs 108AZ and 108BZ perform white balance setting and gamma setting on the image data subjected to signal processing by from the solid-state image sensors 22AZ and 22BZ, respectively. The MEMC 114Z is coupled to an SDRAM 116Z. The SDRAM 116Z temporarily stores data when the ISPs 108AZ and 108BZ and the distortion correction/image composite block 118Z perform distortion processing. The distortion correction/image composite block 118Z applies distortion correction and top-bottom correction to the partial images captured by the imaging optical systems, using data from the triaxial accelerometer 120Z, so as to composite the images.

The processor 100Z further includes a DMAC 122Z, an image processing block 124Z, the CPU 130Z, an image data transferring unit 126Z, a SDRAMC 128Z, a memory card controlling block 140Z, a universal serial bus (USB) block 146Z, a peripheral block 150Z, a sound unit 152Z, a serial block 158Z, a liquid crystal display (LCD) driver 162Z, and a bridge 168Z.

The CPU 130Z controls the operation of each part of the imaging system 1. The image processing block 124Z performs various types of image processes on image data using a resize block 132Z, a joint photographic experts group (JPEG) block 134Z, and H. 264 block 136Z. The resize block 132Z enlarges or reduces the size of the image data by interpolation processing. The JPEG block 134Z is a codec block that performs JPEG compression and decompression. The H.264 block 136Z is a codec block that compresses and decompresses a moving image such as H.264. The image data transferring unit 126Z transfers the image on which the image processing has been performed by the image processing block 124Z. The SDRAMC 128Z controls an SDRAM 138Z coupled to the processor 100Z, and the SDRAM 138Z temporarily stores image data when various pieces of processing is performed on the image data in the processor 100Z.

The memory card controlling block 140Z controls reading and writing from/to a memory card and a flash read only memory (ROM) 144Z inserted into the memory card slot 142Z. The memory card slot 142Z is a slot to detachably attach a memory card to the imaging system 1. The USB block 146Z controls USB communication to an external device such as a personal computer coupled via the USB connector 148Z. The peripheral block 150Z is coupled to a power switch 166Z. The sound unit 152Z is coupled to a microphone 156Z that receives an audio signal from a user and a speaker 154Z that outputs the recorded audio signal and controls sound input and output. The serial block 158Z controls serial communication with an external device such as a PC, and is connected to a wireless network interface card (NIC) 160Z. The Liquid Crystal Display (LCD) driver 162Z is a driver circuit that drives an LCD monitor 164Z and performs conversion to a signal used to display various states on the LCD monitor 164Z.

The flash ROM 144Z stores a control program written in a code that can be decoded by the CPU 130Z and various parameters. When the power is turned on by the operation of a power switch 166Z, the control program mentioned above is loaded into the main memory. The CPU 130Z controls operation of each part in the imaging system 1 according to the program loaded into the main memory, while temporarily saving data necessary for control on the SDRAM 138Z and a local static random access memory (SRAM).

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

This patent application is based on and claims priority pursuant to 35 U.S.C. § 119(a) to Japanese Patent Application No. 2018-037303, filed on Mar. 2, 2018 and Japanese Patent Application No. 2018-237191, filed on Dec. 19, 2018 in the Japan Patent Office, the entire disclosure of which is hereby incorporated by reference herein.

REFERENCE SIGNS LIST 1 imaging system
10 casing
A wide-angle lens system (fish-eye lens system, optical system, imaging optical system)
AF front group
AR rear group
AS stop (variable aperture stop)
AP first prism (first reflector)
AP second prism (second reflector)
AP third prism (third reflector)
AP3X convex surface
AM mirror
AI image sensor
B wide-angle lens system (fish-eye lens system, optical system, imaging optical system)
BF front group
BR rear group
BS stop (variable aperture stop)
BP1 first prism (first reflector)
BP2 second prism (second reflector)
BP3 third prism (third reflector)
BP3X convex surface
BM mirror
BI image sensor
L1 negative lens
L2 negative lens
L3 negative lens
L4 positive lens
L5 positive lens
L6 positive lens
L7 negative lens
L8 positive lens
L9 negative lens
L10 positive lens

The invention claimed is:

1. A spherical imaging optical system in a casing, the spherical imaging optical system comprising:
two optical systems having the same structures, each optical system including an image sensor, a front group, a rear group, a first reflector, a second reflector, and a third reflector,
the front group and the rear group being arranged in that order in a direction from an object side to an image side,
the first reflector being between the front group and the rear group,
the second reflector being between the first reflector and the rear group,
the third reflector being between the rear group and the image sensor,
wherein the front group of one of the optical systems and the front group of the other one of the optical systems are arranged facing opposite directions along a front-to-back direction of the casing, the front group of one of optical systems and the front group of the other one of the optical systems being disposed along an optical axis that is shared by the optical systems and parallel to an axis along the front-to-back direction of the casing, wherein the image sensor of each optical system is below a corresponding front group of the front groups of the optical systems along an up-to-down direction of the casing, and two image sensors of the two optical systems are disposed back to back with an image plane of one of the two image sensors and an image plane of the other one of the two image sensors facing opposite directions along a right-to-left direction of the casing, and an opposite plane of one of the two image sensors and an opposite plane of the other one of the two image sensors facing to each other along the right-to-left direction of the casing such that the optical axis of the front group is parallel to the imaging plane of the image sensor in one of the optical systems and the optical axis of the front group is parallel to the imaging plane of the image sensor in the other one of the optical systems, wherein the first reflector in each optical system is configured to bend an optical path between the front group and the second reflector in opposite directions right or left along the right-to-left direction, wherein the second reflector in each optical system is configured to bend an optical path between the first reflector and the rear group downward along the up-to-down direction, and wherein the third reflector in each optical system is configured to bend an optical path between the rear group and the image sensor in opposite directions along the right-to-left direction.

2. The optical system according to claim 1, wherein a stop is disposed between the first reflector and the second reflector.

3. The optical system according to claim 2, wherein an aperture of the stop is set based on an output of a corresponding image sensor.

4. The optical system according to claim 1, wherein the third reflector has a convex exit surface.

5. The optical system according to claim 1, wherein a convex lens is disposed following the third reflector.

6. The optical system according to claim 1, wherein each of the optical systems being configured to form an image on a corresponding image sensor of the two image sensors.

7. An imaging apparatus, comprising:
two optical systems having the same structures;
two image sensors; and
a casing housing the two optical systems and the two image sensors,
wherein each of the optical systems includes an image sensor, a front group, a rear group, a first reflector, a second reflector, and a third reflector,
the front group and the rear group being arranged in that order in a direction from an object side to an image side,
the first reflector being between the front group and the rear group,
the second reflector being between the first reflector and the rear group,
the third reflector being between the rear group and the image sensor,
wherein the front group of one of the optical systems and the front group of the other one of the optical systems are arranged facing opposite directions along a front-to-back direction of the casing, the front group of one of optical systems and the front group of the other one of the optical systems being disposed along an optical axis that is shared by the optical systems and parallel to an axis along the front-to-back direction of the casing,
wherein the image sensor of each optical system is below a corresponding front group of the front groups of the optical systems along an up-to-down direction of the casing, and two image sensors of the two optical systems are disposed back to back with an image plane of one of the two image sensors and an image plane of the other one of the two image sensors facing opposite directions along a right-to-left direction of the casing, and an opposite plane of one of the two image sensors and an opposite plane of the other one of the two image sensors facing to each other along the right-to-left direction of the casing such that the optical axis of the front group is parallel to the imaging plane of the image sensor in one of the optical systems and the optical axis of the front group is parallel to the imaging plane of the image sensor in the other one of the optical systems,
wherein the first reflector in each optical system is configured to bend an optical path between the front group and the second reflector in opposite directions right or left along the right-to-left direction,
wherein the second reflector in each optical system is configured to bend an optical path between the first reflector and the rear group downward along the up-to-down direction, and
wherein the third reflector in each optical system is configured to bend an optical path between the rear group and the image sensor in opposite directions along the right-to-left direction.

8. The optical system of claim 7, wherein
in each of the optical systems, a stop is disposed between the front group and the rear group, and
the rear group has positive refractive power.

9. The optical system of claim 8, wherein only the stop is disposed between the two reflectors.

10. The optical system according to claim 1, wherein an incident surface of the front lens closest to the object side within one of the two optical systems and a corresponding image plane of one of the two image sensors form 90 degrees relative to each other.

11. The optical system according to claim 7, wherein an incident surface of the front lens closest to the object side within one of the two optical systems and a corresponding image plane of one of the two image sensors form 90 degrees relative to each other.

* * * * *